United States Patent
Dai et al.

(10) Patent No.: US 12,206,100 B2
(45) Date of Patent: Jan. 21, 2025

(54) MONO-GRAIN CATHODE MATERIALS

(71) Applicant: Apple Inc., Cupertino, CA (US)

(72) Inventors: Hongli Dai, Los Altos, CA (US); Huiming Wu, San Jose, CA (US); Dapeng Wang, Cupertino, CA (US); John David Carter, Bolingbrook, IL (US); Yan Li, Westmont, IL (US); Anh D. Vu, Lemont, IL (US); Xiaoping Wang, Naperville, IL (US); Christopher S. Johnson, Naperville, IL (US); Rui Xu, Lemont, IL (US); Zhenzhen Yang, Westmont, IL (US); Yanjie Cui, Arlington Heights, IL (US); James A. Gilbert, Bolingbrook, IL (US); Arthur Jeremy Kropf, Westmont, IL (US); Hakim H. Iddir, Hoffman Estates, IL (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 16/999,265

(22) Filed: Aug. 21, 2020

(65) Prior Publication Data
US 2021/0057739 A1 Feb. 25, 2021

Related U.S. Application Data

(60) Provisional application No. 62/889,927, filed on Aug. 21, 2019.

(51) Int. Cl.
H01M 4/505 (2010.01)
H01M 4/04 (2006.01)
H01M 4/525 (2010.01)
H01M 4/02 (2006.01)

(52) U.S. Cl.
CPC ......... H01M 4/505 (2013.01); H01M 4/0435 (2013.01); H01M 4/0471 (2013.01); H01M 4/525 (2013.01); H01M 2004/028 (2013.01)

(58) Field of Classification Search
CPC .. H01M 4/505; H01M 4/0435; H01M 4/0471; H01M 4/525; H01M 2004/028
See application file for complete search history.

(56) References Cited

U.S. PATENT DOCUMENTS

| | | | |
|---|---|---|---|
| 5,744,262 A | 4/1998 | Cheng et al. | |
| 5,993,998 A | 11/1999 | Yasuda | |
| 6,007,947 A | 12/1999 | Mayer | |
| 6,077,496 A | 6/2000 | Hiraoka et al. | |
| 6,677,082 B2 | 1/2004 | Thackeray et al. | |
| 6,680,143 B2 | 1/2004 | Thackeray et al. | |
| 6,878,487 B2 | 4/2005 | Cho et al. | |
| 7,135,252 B2 | 11/2006 | Thackeray et al. | |
| 7,205,072 B2 | 4/2007 | Kang et al. | |
| 7,235,193 B2 | 6/2007 | Park et al. | |
| 7,238,450 B2 | 6/2007 | Howard, Jr. et al. | |
| 7,255,963 B2 | 8/2007 | Nagayama et al. | |
| 7,314,682 B2 | 1/2008 | Thackeray et al. | |
| 7,314,684 B2 | 1/2008 | Kang et al. | |
| 7,435,402 B2 | 10/2008 | Kang et al. | |
| 7,468,223 B2 | 12/2008 | Thackeray et al. | |
| 7,655,361 B2 | 2/2010 | Kim et al. | |
| 7,691,535 B2 | 4/2010 | Shiozaki et al. | |
| 7,732,096 B2 | 6/2010 | Thackeray et al. | |
| 7,754,384 B2 | 7/2010 | Patoux et al. | |
| 7,897,674 B2 | 3/2011 | Zaghib | |
| 7,923,149 B2 | 4/2011 | Hwang et al. | |
| 8,148,011 B2 | 1/2012 | Thackeray et al. | |
| 8,187,746 B2 | 5/2012 | Chen et al. | |
| 8,206,852 B2 | 6/2012 | Chang et al. | |
| 8,277,683 B2 | 10/2012 | Deng et al. | |
| 8,337,727 B2 | 12/2012 | Chen et al. | |
| 8,343,663 B2 | 1/2013 | Jung et al. | |
| 8,383,077 B2 | 2/2013 | Thackeray et al. | |
| 8,535,832 B2 | 9/2013 | Karthikeyan et al. | |
| 8,801,960 B2 | 8/2014 | Ueda et al. | |
| 8,802,290 B2 | 8/2014 | Li et al. | |
| 9,166,222 B2 | 10/2015 | Amiruddin et al. | |
| 9,716,265 B2 | 7/2017 | Dai et al. | |
| 9,843,041 B2 | 12/2017 | Lopez et al. | |
| 10,084,187 B2 | 9/2018 | Dai et al. | |
| 10,128,494 B2 | 11/2018 | Dai et al. | |

(Continued)

FOREIGN PATENT DOCUMENTS

| | | |
|---|---|---|
| CN | 1588675 | 3/2005 |
| CN | 1702891 | 11/2005 |

(Continued)

OTHER PUBLICATIONS

Yaoming Deng, Tianxing Kang, Zhen Ma, Xinxin Tan, Xiaona Song, Zheng Wang, Peipei Pang, Dong Shu, Xiaoxi Zuo, Junmin Nan, Safety influences of the Al and Ti elements modified LiCoO2 materials on LiCoO2/graphite batteries under the abusive conditions, Electrochimica Acta, vol. 295, pp. 703-709 (Year: 2019).*

"Cathode", LithiumIonBattery.org, as published on Mar. 9, 2018 (Year: 2018).*

Zhao et al., "Progress of Research on the Li-rich Cathode Materials xLi2MnO3(1-x)LiMO2(M+Co, Fe, Ni1/2Mn1/2 . . . ) for Li-ion Batteries," Journal of Inorganic Materials, vol. 26(7), pp. 673-679, Jul. 2011.

Lee et al., "Characteristics of LiCoO2 and Its Precursor Synthesized by a Uniform Precipitation Method," Electrochemical and Solid-State Letters, 2010, vol. 13, No. 7, pp. A81-A84.

Kobayashi et al., "Study on the Crystal and Electronic Structures of the Layered Li2Mo3—LiMo2 Materials in Li De-Intercalation Process," Photon Factory Activity Report, 2012, vol. 29, No. 2011, 1 pp.

(Continued)

Primary Examiner — Carlos Barcena
(74) Attorney, Agent, or Firm — BakerHostetler

(57) ABSTRACT

Compounds, particles, and cathode active materials that can be used in lithium ion batteries are described herein. Methods of making such compounds, powders, and cathode active materials are described. The particles have a particle size distribution with a D50 ranging from 10 μm to 20 μm.

6 Claims, 24 Drawing Sheets

(56) References Cited

U.S. PATENT DOCUMENTS

| | | |
|---|---|---|
| 10,141,572 B2 | 11/2018 | Wu et al. |
| 10,164,256 B2 | 12/2018 | Wu et al. |
| 10,297,821 B2 | 5/2019 | Dai et al. |
| 10,297,823 B2 | 5/2019 | Dai et al. |
| 10,347,909 B2 | 7/2019 | Dai et al. |
| 10,593,941 B2 | 3/2020 | Dai et al. |
| 10,597,307 B2 | 3/2020 | Dai et al. |
| 10,615,413 B2 | 4/2020 | Dai et al. |
| 2002/0061444 A1 | 5/2002 | Kweon et al. |
| 2002/0114995 A1 | 8/2002 | Thackeray |
| 2002/0136954 A1 | 9/2002 | Thackeray |
| 2002/0182504 A1 | 12/2002 | Imachi et al. |
| 2003/0013017 A1 | 1/2003 | Nagayama et al. |
| 2003/0039886 A1 | 2/2003 | Zhang et al. |
| 2003/0054250 A1 | 3/2003 | Kweon et al. |
| 2003/0073002 A1 | 4/2003 | Imachi et al. |
| 2003/0082445 A1 | 5/2003 | Smieth et al. |
| 2003/0134200 A1 | 7/2003 | Tanaka et al. |
| 2004/0029008 A1 | 2/2004 | Winterberg |
| 2004/0191633 A1 | 9/2004 | Johnson et al. |
| 2004/0201948 A1 | 10/2004 | Hosoya et al. |
| 2004/0213729 A1* | 10/2004 | Suhara .............. H01M 4/525 429/231.95 |
| 2004/0253516 A1 | 12/2004 | Yuasa et al. |
| 2004/0258836 A1 | 12/2004 | Besenhard et al. |
| 2005/0019659 A1* | 1/2005 | Shiozaki .............. C01G 53/50 429/223 |
| 2005/0026040 A1 | 2/2005 | Thackeray |
| 2005/0074675 A1 | 4/2005 | Nishijima et al. |
| 2005/0130042 A1 | 6/2005 | Liu et al. |
| 2005/0136329 A1 | 6/2005 | Howard, Jr. et al. |
| 2005/0181279 A1 | 8/2005 | Hosoya |
| 2005/0265909 A1 | 12/2005 | Kajiya et al. |
| 2005/0271948 A1 | 12/2005 | Kang |
| 2006/0024584 A1 | 2/2006 | Kim et al. |
| 2006/0068293 A1 | 3/2006 | Kim et al. |
| 2006/0081818 A1 | 4/2006 | Ito et al. |
| 2006/0088767 A1 | 4/2006 | Li et al. |
| 2006/0099508 A1 | 5/2006 | Thackeray et al. |
| 2006/0159994 A1 | 7/2006 | Dahn et al. |
| 2006/0177739 A1 | 8/2006 | Endo et al. |
| 2006/0194118 A1 | 8/2006 | Yew et al. |
| 2006/0240326 A1 | 10/2006 | Lee |
| 2007/0048619 A1 | 3/2007 | Inda |
| 2007/0117014 A1* | 5/2007 | Saito .............. H01M 4/131 423/594.6 |
| 2007/0122705 A1* | 5/2007 | Paulsen .............. H01M 4/366 429/223 |
| 2007/0141469 A1 | 6/2007 | Tokunaga et al. |
| 2007/0172739 A1 | 7/2007 | Visco |
| 2007/0202407 A1 | 8/2007 | Eberman et al. |
| 2007/0264573 A1 | 11/2007 | Yamada et al. |
| 2007/0292761 A1 | 12/2007 | Park et al. |
| 2008/0057401 A1 | 3/2008 | Mori et al. |
| 2008/0090150 A1 | 4/2008 | Nakura |
| 2008/0118836 A1 | 5/2008 | Hwang et al. |
| 2008/0118847 A1 | 5/2008 | Jung et al. |
| 2008/0131778 A1 | 6/2008 | Watanabe et al. |
| 2008/0131781 A1 | 6/2008 | Yong et al. |
| 2008/0160415 A1 | 7/2008 | Wakita et al. |
| 2008/0268339 A1 | 10/2008 | Suzuki |
| 2008/0280205 A1 | 11/2008 | Jiang et al. |
| 2008/0311473 A1 | 12/2008 | Sasaoka et al. |
| 2008/0318131 A1 | 12/2008 | Watanabe et al. |
| 2009/0092903 A1 | 4/2009 | Johnson et al. |
| 2009/0146115 A1 | 6/2009 | Xiao et al. |
| 2009/0200510 A1 | 8/2009 | Watanabe et al. |
| 2009/0202905 A1 | 8/2009 | Morita et al. |
| 2009/0239148 A1 | 9/2009 | Jiang |
| 2010/0055567 A1 | 3/2010 | Nakai et al. |
| 2010/0086853 A1 | 4/2010 | Venkatachalam et al. |
| 2010/0086854 A1 | 4/2010 | Kumar et al. |
| 2010/0151332 A1 | 6/2010 | Lopez et al. |
| 2010/0173197 A1 | 7/2010 | Li et al. |
| 2010/0304225 A1 | 12/2010 | Pascaly et al. |
| 2011/0014518 A1 | 1/2011 | Nakai et al. |
| 2011/0017529 A1 | 1/2011 | Kumar et al. |
| 2011/0031437 A1 | 2/2011 | Nagase et al. |
| 2011/0052981 A1 | 3/2011 | Lopez et al. |
| 2011/0053001 A1 | 3/2011 | Babic et al. |
| 2011/0065006 A1 | 3/2011 | Ogasa |
| 2011/0076556 A1 | 3/2011 | Karthikeyan et al. |
| 2011/0076564 A1 | 3/2011 | Yu et al. |
| 2011/0081578 A1 | 4/2011 | Chang et al. |
| 2011/0089369 A1 | 4/2011 | Patoux et al. |
| 2011/0111294 A1 | 5/2011 | Lopez et al. |
| 2011/0111298 A1 | 5/2011 | Lopez et al. |
| 2011/0121240 A1 | 5/2011 | Amine et al. |
| 2011/0136019 A1 | 6/2011 | Amiruddin et al. |
| 2011/0143174 A1 | 6/2011 | Kim |
| 2011/0165463 A1 | 7/2011 | Chang et al. |
| 2011/0165474 A1 | 7/2011 | Im et al. |
| 2011/0171371 A1 | 7/2011 | Li et al. |
| 2011/0171539 A1 | 7/2011 | Patoux et al. |
| 2011/0200864 A1 | 8/2011 | Dai |
| 2011/0200880 A1 | 8/2011 | Yu |
| 2011/0223492 A1 | 9/2011 | Sakitani et al. |
| 2011/0244331 A1 | 10/2011 | Karthikeyan et al. |
| 2011/0269018 A1 | 11/2011 | Kono et al. |
| 2011/0294006 A1 | 12/2011 | Amine et al. |
| 2011/0294019 A1 | 12/2011 | Amine et al. |
| 2012/0015250 A1 | 1/2012 | Teng et al. |
| 2012/0028134 A1 | 2/2012 | Kim et al. |
| 2012/0040247 A1 | 2/2012 | Manivannan et al. |
| 2012/0168696 A1 | 7/2012 | Huang et al. |
| 2012/0196176 A1 | 8/2012 | He et al. |
| 2012/0258369 A1 | 10/2012 | Yokoyama et al. |
| 2012/0282522 A1 | 11/2012 | Axelbaum et al. |
| 2012/0295155 A1 | 11/2012 | Deng et al. |
| 2013/0004826 A1 | 1/2013 | Li et al. |
| 2013/0011738 A1 | 1/2013 | Zhou |
| 2013/0101893 A1 | 4/2013 | Dai et al. |
| 2013/0149604 A1 | 6/2013 | Fujiki et al. |
| 2013/0252107 A1 | 9/2013 | Lee et al. |
| 2013/0260249 A1 | 10/2013 | Choi |
| 2013/0344391 A1 | 12/2013 | Yushin et al. |
| 2014/0087065 A1 | 3/2014 | Li et al. |
| 2014/0087254 A1 | 3/2014 | Li et al. |
| 2014/0087256 A1 | 3/2014 | Li et al. |
| 2014/0087261 A1 | 3/2014 | Li et al. |
| 2014/0141331 A1 | 5/2014 | Lee et al. |
| 2014/0158932 A1 | 6/2014 | Sun et al. |
| 2014/0175329 A1 | 6/2014 | Palma et al. |
| 2014/0193693 A1 | 7/2014 | Hoshina et al. |
| 2014/0234715 A1 | 8/2014 | Fasching et al. |
| 2014/0272563 A1 | 9/2014 | Dai et al. |
| 2015/0010819 A1 | 1/2015 | Lee et al. |
| 2015/0140421 A1 | 5/2015 | Ihara et al. |
| 2015/0171423 A1 | 6/2015 | Kim et al. |
| 2015/0180024 A1 | 6/2015 | Nose |
| 2015/0188144 A1 | 7/2015 | Shin et al. |
| 2015/0243971 A1 | 8/2015 | Cho et al. |
| 2015/0243984 A1 | 8/2015 | Kase et al. |
| 2015/0303519 A1 | 10/2015 | Hanazaki |
| 2015/0311522 A1 | 10/2015 | Fang et al. |
| 2016/0036043 A1 | 2/2016 | Dai et al. |
| 2016/0133929 A1 | 5/2016 | Hah et al. |
| 2016/0156032 A1 | 6/2016 | Lee et al. |
| 2016/0260965 A1 | 9/2016 | Wu et al. |
| 2016/0293941 A1 | 10/2016 | Yamasaki et al. |
| 2016/0315315 A1 | 10/2016 | Olken et al. |
| 2016/0351973 A1 | 12/2016 | Albano et al. |
| 2017/0018767 A1 | 1/2017 | Park et al. |
| 2017/0092949 A1 | 3/2017 | Dai et al. |
| 2017/0133678 A1 | 5/2017 | Ozoemena et al. |
| 2017/0155145 A1 | 6/2017 | Kusachi et al. |
| 2017/0187071 A1 | 6/2017 | Wang et al. |
| 2017/0187072 A1 | 6/2017 | Wang et al. |
| 2017/0214045 A1 | 7/2017 | Dai et al. |
| 2017/0263917 A1 | 9/2017 | Dai et al. |
| 2017/0263928 A1 | 9/2017 | Dai et al. |
| 2017/0263929 A1 | 9/2017 | Wu et al. |
| 2017/0279162 A1 | 9/2017 | Vissers et al. |
| 2017/0346082 A1 | 11/2017 | Dai et al. |

(56) References Cited

U.S. PATENT DOCUMENTS

| | | | |
|---|---|---|---|
| 2018/0062156 A1 | 3/2018 | Wu et al. | |
| 2018/0079655 A1 | 3/2018 | Dai et al. | |
| 2018/0083277 A1 | 3/2018 | Dai et al. | |
| 2018/0083278 A1 | 3/2018 | Dai et al. | |
| 2018/0114983 A9 | 4/2018 | Dai et al. | |
| 2018/0114984 A9 | 4/2018 | Wu et al. | |
| 2018/0123117 A9 | 5/2018 | Dai et al. | |
| 2018/0215629 A1 | 8/2018 | Honma et al. | |
| 2018/0257947 A9 | 9/2018 | Dai et al. | |
| 2018/0294522 A1 | 10/2018 | Dai et al. | |
| 2018/0331360 A1 | 11/2018 | Meng et al. | |
| 2018/0351173 A1 | 12/2018 | Dai et al. | |
| 2019/0027747 A9 | 1/2019 | Dai et al. | |
| 2019/0051893 A1 | 2/2019 | Zhang et al. | |
| 2019/0067686 A1 | 2/2019 | Dai et al. | |
| 2019/0074514 A1 | 3/2019 | Wu et al. | |
| 2020/0035991 A1* | 1/2020 | Wang | H01M 4/131 |
| 2020/0044242 A1 | 2/2020 | Wang et al. | |
| 2020/0058933 A1 | 2/2020 | Wu et al. | |
| 2020/0075951 A1 | 3/2020 | Dai et al. | |
| 2020/0189930 A1 | 6/2020 | Dai et al. | |
| 2020/0259208 A1 | 8/2020 | Yamamoto | |
| 2020/0266435 A1 | 8/2020 | Dai et al. | |
| 2020/0358093 A1* | 11/2020 | Oshita | G01N 21/71 |

FOREIGN PATENT DOCUMENTS

| | | |
|---|---|---|
| CN | 1770514 | 10/2006 |
| CN | 101083321 | 12/2007 |
| CN | 101088918 | 12/2007 |
| CN | 101150190 | 3/2008 |
| CN | 101223660 | 7/2008 |
| CN | 101284681 | 10/2008 |
| CN | 101304090 | 11/2008 |
| CN | 101510603 | 8/2009 |
| CN | 101694877 | 4/2010 |
| CN | 101734728 | 6/2010 |
| CN | 102110808 | 6/2011 |
| CN | 102195094 A | 9/2011 |
| CN | 102299299 | 12/2011 |
| CN | 102332585 | 1/2012 |
| CN | 102368548 | 3/2012 |
| CN | 101789499 | 4/2012 |
| CN | 102439765 A | 5/2012 |
| CN | 102479947 | 5/2012 |
| CN | 102484249 | 5/2012 |
| CN | 102544575 | 7/2012 |
| CN | 102646831 | 8/2012 |
| CN | 102683666 | 9/2012 |
| CN | 102723459 | 10/2012 |
| CN | 102751481 | 10/2012 |
| CN | 102881891 | 1/2013 |
| CN | 103151520 | 6/2013 |
| CN | 103296249 | 9/2013 |
| CN | 102386381 | 1/2014 |
| CN | 103560250 | 2/2014 |
| CN | 103606674 A | 2/2014 |
| CN | 103682311 | 3/2014 |
| CN | 103872302 | 6/2014 |
| CN | 103872315 | 6/2014 |
| CN | 103972493 | 8/2014 |
| CN | 104022280 | 9/2014 |
| CN | 104201323 A | 12/2014 |
| CN | 104300138 | 1/2015 |
| CN | 104466099 | 3/2015 |
| CN | 104577128 A | 4/2015 |
| CN | 104868122 | 8/2015 |
| CN | 104966833 A | 10/2015 |
| CN | 105161710 | 12/2015 |
| CN | 105895909 A | 8/2016 |
| CN | 106450211 | 2/2017 |
| DE | 10352063 | 6/2005 |
| JP | 4-267053 | 9/1992 |
| JP | H-10-087327 | 4/1998 |
| JP | 2001-167763 A | 6/2001 |
| JP | 2001-319652 A | 11/2001 |
| JP | 2002-201028 A | 7/2002 |
| JP | 2004-047180 A | 2/2004 |
| JP | 2005-101003 | 4/2005 |
| JP | 2005-149867 | 6/2005 |
| JP | 2005-289700 | 10/2005 |
| JP | 2005-302507 A | 10/2005 |
| JP | 2006-173137 A | 6/2006 |
| JP | 2006-344509 | 12/2006 |
| JP | 2007-091502 A | 4/2007 |
| JP | 2007-517368 | 6/2007 |
| JP | 2007-173113 A | 7/2007 |
| JP | 2009-4311 | 1/2009 |
| JP | 2009-217981 | 9/2009 |
| JP | 2010-541166 | 12/2010 |
| JP | 2011-105594 A | 6/2011 |
| JP | 2011-113869 | 6/2011 |
| JP | 2013-180917 | 9/2013 |
| JP | 5369568 B2 * | 12/2013 |
| JP | 2015-213038 | 11/2015 |
| JP | 2016-517615 A | 6/2016 |
| JP | 2017-191738 | 10/2017 |
| KR | 10-2002-0063501 | 8/2002 |
| KR | 10-2005-0121727 | 12/2005 |
| KR | 10-2014-0073856 | 6/2014 |
| KR | 10-2014-0108615 | 9/2014 |
| KR | 2016-0010313 A | 1/2016 |
| KR | 101731473 | 4/2017 |
| TW | 201126798 | 8/2011 |
| TW | 201311545 A | 3/2013 |
| TW | 201342695 | 10/2013 |
| WO | WO 2003/049216 A1 | 6/2003 |
| WO | WO 2003/081698 A1 | 10/2003 |
| WO | WO 2004/045015 | 5/2004 |
| WO | WO 2004/102700 A1 | 11/2004 |
| WO | WO 2004/107480 | 12/2004 |
| WO | WO 2008/069351 | 6/2008 |
| WO | WO 2009/120515 | 10/2009 |
| WO | WO 2010/011569 | 1/2010 |
| WO | WO 2010/139404 | 12/2010 |
| WO | WO 2011/020073 | 2/2011 |
| WO | WO 2011/054441 | 5/2011 |
| WO | WO 2013/048048 | 4/2013 |
| WO | WO 2014/014913 | 1/2014 |
| WO | WO 2014/119165 | 8/2014 |
| WO | WO 2016/143572 | 9/2016 |
| WO | WO 2019/211366 A1 | 11/2019 |

OTHER PUBLICATIONS

Giordano et al., "Metal Nitride and Metal Carbide Nanoparticles by a Soft Urea Pathway," *Chem. Mater.*, 2009, vol. 21, pp. 5136-5144.

Dou et al., "Synthesis and electrochemical properties of layered LiNi0.5-xMn0.5-xCo2xO2 for lithium-ion battery from nickel manganese cobalt precursor," *J Solid State Electrochem*, (2011), vol. 15, pp. 399-404.

Li, "Layered Oxides Li1+xM1-xO2 (M = Ni, Mn, Co, Al) As Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI No. 3474185, 158 pages.

Hu et al., "Ni, Mn—Co doped High-Voltage LiCoO2 Cathode Material for Lithium Ion Batteries," Chinese Journal of Inorganic Chemistry, 2015, vol. 31, Issue 1, pp. 159-165.

Rodrigues et al., "A novel coprecipitation method towards the synthesis of NiXMnXCo(1-2X)(OH)2 for the preparation of lithium metal oxides," *J Solid State Electrochem*, 2012, vol. 16, pp. 1121-1132.

Cho et al., "LiCoO2 Cathode Material That Does Not Show a Phase Transition from Hexagonal to Monoclinic Phase," 2001, *Journal of The Electrochemical Society*, vol. 148, No. 10, pp. A1110-A1115.

Jung et al., "Enhanced Stability of LiCoO2 Cathodes in Lithium-Ion Batteries Using Surface Modification by Atomic Layer Deposition," 2010, *Journal of The Electrochemical Society*, vol. 157, No. 1, pp. A75-A81.

(56) References Cited

OTHER PUBLICATIONS

Koyama et al., "First principles study of dopant solubility and defect chemistry in LiCoO2," *J. Mater. Chem A.*, 2014, vol. 2, pp. 11235-11245.

Arunkumar et al., "Chemical and structural instability of the chemically delithiated (1-z) Li[Li$_{1/3}$Mn$_{2/3}$]O2 (z) Li[CO$_{1-y}$Ni$_y$]O2 (O ≤ y ≤ 1 and 0 ≤ z ≤ 1) solid solution cathodes," *Journal of Materials Chemistry*, 2008, vol. 18, pp. 190-198.

Sun et al., "The Role of AlF3 Coatings in Improving Electrochemical Cycling of Li-Enriched Nickel-Manganese Oxide Electrodes for Li-Ion Batteries," *Adv. Mater.*, 2012, vol. 24, pp. 1192-1196.

Robertson et al., "Layered Li$_x$Mn$_{1-y}$Co$_y$O$_2$ Intercalation Electrodes—Influence of Ion Exchange on Capacity and Structure upon Cycling," *Chem. Mater.*, 2001, vol. 13, pp. 2380-2386.

Patoux et al., "Layered Manganese Oxide Intergrowth Electrodes for Rechargeable Lithium Batteries. 2. Substitution with Al," *Chem. Mater.*, 2005, vol. 17, pp. 1044-1054.

Myung et al., "Role of Alumina Coating on Li—Ni—Co—Mn—O Particles as Positive Electrode Material for Lithium-Ion Batteries," *Chem. Mater.*, 2005, vol. 17, pp. 3695-3704.

Wang et al., "Synthesis of Li$_2$MnO$_3$-stabilized LiCoO$_2$ cathode material by spray-drying method and its high voltage performance," *Journal of Alloys and Compounds*, 2015, vol. 626, pp. 228-233.

Zeng et al., "Cation ordering in Li[NixMnxCo(1-2x)]O-2-layered cathode materials: A nuclear magnetic resonance (NMR), pair distribution function, X-ray absorption spectroscopy, and electrochemical study," *Chemistry of Materials*, 2007, vol. 19. No. 25, pp. 6277-6289.

Zeng et al., "Investigation of the Structural Changes in Li[NiyMnyCo(1-2y)]O-2 (y=0.05) upon Electrochemical Lithium Deintercalation," *Chemistry of Materials*, 2010, vol. 22, No. 3, pp. 1209-1219.

Saadoune et al., "LiNi0.1Mn0.1Co0.8O2 electrode material: Structural changes upon lithium electrochemical extraction," *Electrochimica Acta*, 2010, vol. 55, No. 18, pp. 5180-5185.

Bentaleb et al., "On the LiNi0.2Mn0.2Co0.6O2 positive electrode material," *Journal of Power Sources*, 2010, vol. 195, No. 5, pp. 1510-1515.

Ben Kamel et al., "Local Structure and electrochemistry of LiNiyMnyCo1-2y)O2 electrode materials for Li-ion batteries," *Ionics*, 2008, vol. 14, No. 2, pp. 89-97.

Stoyanova et al., "High-Frequency Electron Paramagnetic Resonance Analysis of the Oxidation State and Local Structure of Ni and Mn Ions in Ni, Mn-Codoped LiCoO2," *Inorganic Chemistry*, 2010, vol. 49, No. 4, pp. 1932-1941.

Menetrier et al., "The insulator-metal transition upon lithium deintercalation from LiCoO2: electronic properties and Li-7 NMR Study," *Journal of Materials Chemistry*, 1999, vol. 9, No. 5, pp. 1135-1140.

Iddir et al., "Stability of Li- and Mn-Rich Layered-Oxide Cathodes within the First-Charge Voltage Plateau," *Journal of the Electrochemical Society*, 2016, vol. 163, No. 8, pp. A1784-A1789.

Seong-Min Bak et al., "Structural Changes and Thermal Stability of Charged LiNixMnyCozO2 Cathode Materials Studied by Combined In Situ Time-Resolved XRD and Mass Spectroscopy," *ACS Appl. Mater. Interfaces*, 2014, vol. 6, ppl.22594-22601.

Nam et al. "Ammonia-free coprecipitation synthesis of a Ni—Co—Mn hydroxide precursor for high-performance battery cathode materials," *Green Chemistry*, 2015. vol. 17, pp. 1127.

Xie et al., "An improved continuous co-precipitation method to synthesize LiNi0.80Co0.15Al0.05O2 cathode material," *Journal of Alloys and Compounds*, 2016, vol. 666, pp. 84-87.

Rouse et al., "Electrochemical Studies of Single Crystals of Lithiated Nickel Oxide," *Journal of The Electrochemical Society*, Feb. 1966, vol. 113, No. 2, pp. 184-190.

Jin et al., "Observation of Bulk Superconductivity in Na$_x$CoO$_2$·yH$_2$O and Na$_x$CoO$_2$·yD$_2$O Powder and Single Crystals," *Phys Rev Lett*, 2008, vol. 91, Issue 21, id. 217001, 4 pages.

Franger et al., "Chemistry and Electrochemistry of Low-Temperature Manganese Oxides as Lithium Intercalation Compounds," *Journal of The Electrochemical Society*, 2000, vol. 147, No. 9, pp. 3226-3230.

Lu et al., "Layered Li[Ni$_x$Co$_{1-2x}$Mn$_x$]O$_2$ Cathode Materials for Lithium-Ion Batteries," *Electrochemical and Solid-State Letters*, 2001, vol. 4, No. 12, pp. A200-A203.

Shinova et al., "Cationic distribution and electrochemical performance of LiCO$_{1/3}$Ni$_{1/3}$Mn$_{1/3}$O2 electrodes for lithium-ion batteries," 2008, *Solid State Ionics*, vol. 179, pp. 2198-2208.

Qian et al., "Lithium Lanthanum Titanium Oxides: A Fast Ionic Conductive Coating for Lithium-Ion Battery Cathodes," *Chemistry of Materials*, 2012, 24 (14), pp. 2744-2751.

Reddy et al., "Effects of LLTO coating on high temperature cycle life performance of LiMn2O4 cathode material," Abstract #382, 2012, The Electrochemical Society, 2 pages.

Davison et al., "Low Cost, Novel Methods for Fabricating All-Solid-State Lithium Ion Batteries," A Major Qualifying Project Submitted to the Faculty of Worcester Polytechnic Institute, Apr. 23, 2012, 126 pages.

Lee et al., "The Effects of Li—La—Ti—O Coating on the Properties of Li[Ni0.3Co0.4Mn0.3]O2 Cathode Material," Journal of the Korean Institute of Electrical and Electronic Material Engineers, Oct. 2009, vol. 22, No. 10, pp. 890-896.

Lee et al., "The Effect of Coating Thickness on the Electrochemical Properties of a Li—La—Ti—O-coated Li[Ni0.3Co0.4Mn0.3]O2 Cathode," *Bull. Korean Chem. Soc.*, 2010, vol. 31, No. 11, pp. 3233-3237.

Hu et al., "Enhanced electrochemical performance of LiMn2O4 cathode with a Li0.34La0.51TiO3-caoted layer," *RSC Advances*, 2015. vol. 5, pp. 17592-17600.

Fergus et al., "Recent Developments in Cathode Materials for Lithium Ion Batteries," *Journal of Power Sources*, Vo. 195, No. 4, 23010, pp. 939-954.

Gille G. et al., "Cathode Materials for Rechargeable Batteries-Preparation, Structure-Property Relationships and Performance," *Solid State Ionics*, Vo. 148, No. 3-4, 2002, pp. 269-282.

Periasamy et al., "High Voltage and High Capacity Characteristics of LiNi1/3Co1/3Mn1/3O2 Cathodes for Lithium Battery Applications," *Int. J. Electrochecm Soc.*, vol. 2, 2007, pp. 689-699.

Manthiram Lab Highlights, "Passivation of Spinel Cathode Surface through Self-Segregarion of Iron," May 7, 2010.

Cerion Power, "Our Power Business," www.cerionenterprises.com/companies_and_applications/power, accessed Sep. 8, 2011.

ETV Motors, "High5ive advanced high-voltage cells," www.etvemotors.com/advanced-battery.htm, accessed Sep. 8, 2011.

Wolfenstine et al., US Army RDECOM, "High Cycle Life Cathode for High Voltage (5V) Lithium Ion Batteries."

Sullivan, "Safe High Voltage Cathode Materials for Pulsed Power Applications," Navy STTR FY2011A—Topic N11A-T035, www.navy.sbir.com/n11_A/navst11-035.htm, accessed Sep. 8, 2011.

Xu, US Army RDECOM, "Electrolyte for Next Generation 5V Li-Ion Batteries."

Ghosh et al., "Block Copolymer Solid Battery Electrolyte with High Li-Ion Transference Number," *Journal of the Electrochemical Society*, 2010, vol. 157, No. 7, pp. A846-A849.

Abu-Lebdeh et al., High-Voltage Electrolytes Based on Adiponitrile for Li-Ion Batteries, *Journal of the Electrochemical Society*, 2009, vol. 156, No. 1, pp. A60-A65.

Jow et al., "High Voltage Electrolytes for Li-ion Batteries," U.S. Research Laboratory, Presentation, May 2011.

Lucht, University of Rhode Island, "Development of Electrolytes for Lithium-ion Batteries," Presentation, May 11, 2001.

Zhang et al, Argonne National Laboratory, Vehicle Technologies Program Annual Merit Review and Peer Evaluation Meeting, "High Voltage Electrolyte for Lithium Batteries," Presentation, Jun. 9-13, 2011.

David Howell, US Department of Energy, "Vehicle Technologies Program," 2011 Annual Merit Review and Peer Evaluation Meeting, Presentation, May 9-13, 2011.

Fey et al., Preparation and electrochemical properties of high-voltage cathode maters, LiMyNi0.5-yMn1.5O4 (M = Fe, Cu, Al, Mg; y = 0.0-0.4), *Journal of Power Sources*, 2003, vol. 115, pp. 332-345.

Kawai et al., "High-voltage lithium cathode materials," Journal of Power Sources, 1999, vols. 81-82, abstract only.

(56) References Cited

OTHER PUBLICATIONS

Huang et al., "Lithium cobalt phosphate: a high voltage lithium ion cathode material," Valence Technologies.

"Award Details," SBIR/STTR, www.sbir.gov/sbirsearch/detail/233700, accessed Sep. 8, 2011.

Ju et al., "LiCo1-xAlxO2 (0≤x≤0.05) cathode powders prepared from the nanosized Co1-xAlxOy precursor powders," *Materials Chemistry and Physics*, 112 (2008), pp. 536-541.

Wu et al., "Effect of Al3+ and F-Doping on the Irreversible Oxygen Loss from Layered Li[Li0.17Mn0.58Ni0.25]O2 Cathodes," *Electrochemical and Solid-State Letters*, 2007, vol. 10, No. 6, pp. A151-A154.

Li et al., "Effects of fluorine doping on structure, surface chemistry, and electrochemical performance of LiNi0.8Co0.15Al0.05O2," *Electrochimica Acta*, 2015, vol. 174, pp. 1122-1130.

Cho et al., "Exploring Lithium Deficiency in Layered Oxide Cathode for Li-Ion Battery," *Advanced Sustainable Systems*, 2017, 1700026, 10 pages.

Lee et al., "Surface modification of LiNi0.5Mn1.5O4 cathodes with ZnAl2O4 by a sol-gel method for lithium ion batteries," *Electrochimica Acta*, 2014, vol. 115, pp. 326-331.

Kim et al., "Effect of fluorine on Li[Ni1/3Co1/3Mn1/3]O2-zFz as lithium intercalation material," *Journal of Power Sources*, 2005, vol. 146, pp. 602-605.

Yue et al., "The enhanced electrochemical performance of LiNi0.6Co0.2Mn0.2O2 cathode materials by low temperature fluorine substitution," *Electrochimica Acta*, 2013, vol. 95, pp. 112-118.

Wang et al., "Effect of surface fluorine substitution on high voltage electrochemical performances of layered LiNi0.5Co0.2Mn0.3O2 cathode materials," *Applied Surface Science*, 2016, vol. 371, pp. 172-179.

Tang et al., "Synthesis and characterization of LiFePO4 coating with aluminum doped zinc oxide," *Trans. Nonferrous Met. Soc. China*, 2013, vol. 23, pp. 451-455.

Myung et al., "Functionality of Oxide Coating for Li[Li0.05Ni0.4Co0.15Mn0.4])2 as Positive Electrode Materials for Lithium-Ion Secondary Batteries," *J. Phys. Chem. C*, 2007, vol. 111, pp. 4061-4067.

Liu et al., "Investigation the electrochemical performance of Li1.2Ni0.2Mn0.6O2 cathode material with ZnAl2O4 coating for lithium ion batteries," *Journal of Alloys and Compounds*, 2016, vol. 685, pp. 523-532.

Kim et al., "Improvement of High-Voltage Cycling Behavior of Surface-Modified Li[Ni1/3Co1/3Mn1/3]O2 Cathodes by Fluorine Substitution for Li-Ion Batteries," *J. Electrochem. Soc.*, 2005, vol. 152, issue 9, pp. A1707-A1713.

Choi et al., "$^{27}$Al NMR Chemical Shifts in Oxide Crystals: A First-Principles Study," *J. Phys. Chem. C*, 2009, 113 (9), pp. 3869-3873.

Lee et al., "Solid-state NMR Studies of Al-doped and Al2O3-coated LiCoO2," *Electrochimica Acta*, Nov. 30, 2004, vol. 50, Issues 2-3, pp. 491-494.

Han et al., "Understanding the Role of Temperature and Cathode Composition on Interface and Bulk: Optimizing Aluminum Oxide Coatings for Li-Ion Cathodes," *ACS Appl. Mater. Interfaces*, 2017, 9 (17), pp. 14769-14778.

Chen et al., "Role of surface coating on cathode materials for lithium-ion batteries," *Journal of Materials Chemistry*, 2010, 20, 7606-7612.

Wenbin, Luo, "Effect of Al, Mg and Mn—Mg Doping on the Structure, Electrochemistry and Thermal Stability of LiCoO2 and LiNi1/3Mn1/3Co1/3O2," China Doctoral Dissertations Full-text Database Engineering Technology Part II, Nov. 15, 2010. (Translation provided by MultiLing).

Xinran, Cui, "Preparation and Properties of Al(3+) Doped Lithium-rich Layered Cathode Material Li[Co0.3Li0.23Mn0.47]O2," China Doctoral Dissertations Full-text Database Engineering Technology Part II, Oct. 15, 2012. (Translation provided by MultiLing).

Levasseur et al., "Evidence for structural defects in on-stoichiometric HT-LiCoO2: electrochemical, electronic properties and 7LI NMR studies," *Solid State Ionics*, 128 (2000), pp. 11-24.

Yuping et al.; "Lithium Ion Batteries—Applications and Practices"; Chapter 5 Cobalt Lithium Oxide Cathode Materials; Chemical Industry Press; Jan. 2012; 4 pages.

Amiruddin et al.; "Electrochemical Characterization of Cathode Material (Li[Ni0.8Co0.1Mn0.1]O2 as Core and Li[Ni0.5-0.5xCoxMn0.5-0.5x]O2 as shell) for Lithium-Ion Batteries"; ECS Meeting Abstracts; Electrochemical Society; No. 240; 2007; one page.

\* cited by examiner

FIG. 3E
FIG. 3C
FIG. 3A
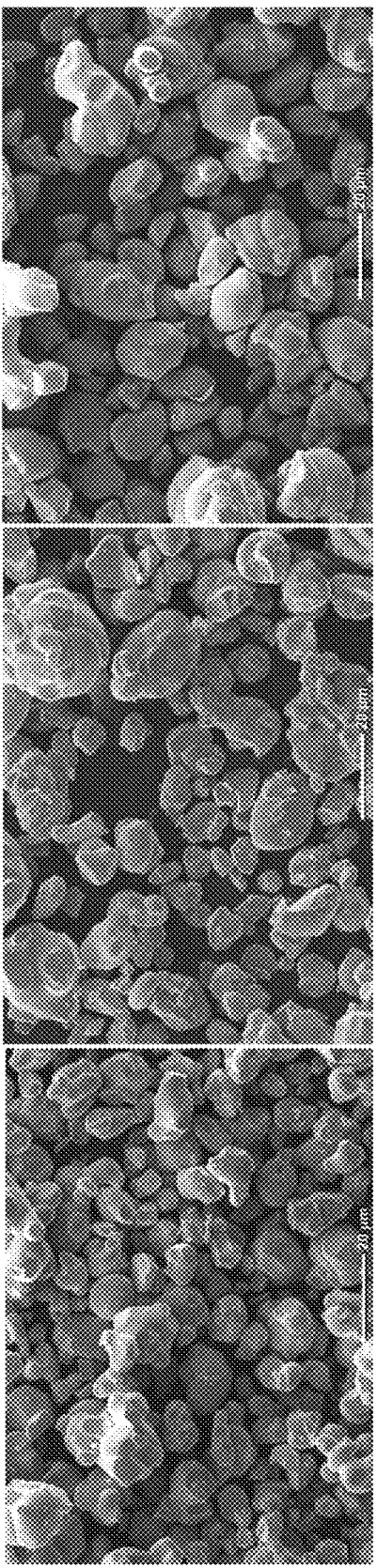
FIG. 3F
FIG. 3D
FIG. 3B

*FIG. 5A* 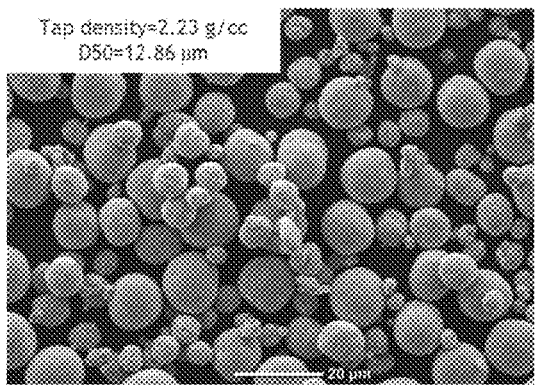 *FIG. 5B* 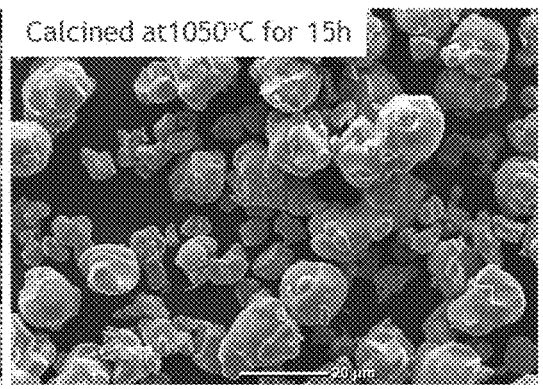
*FIG. 5C* 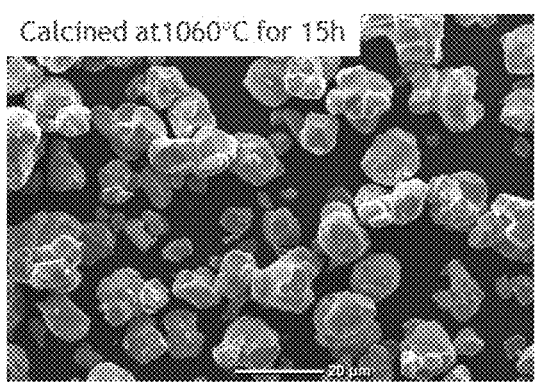 *FIG. 5D* 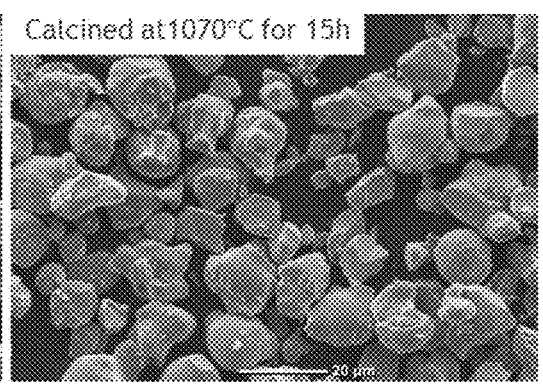
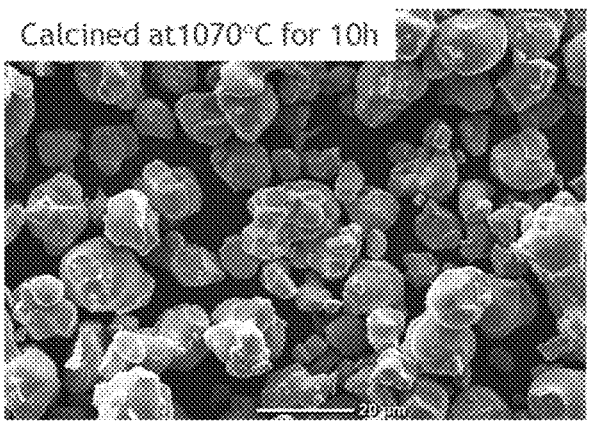 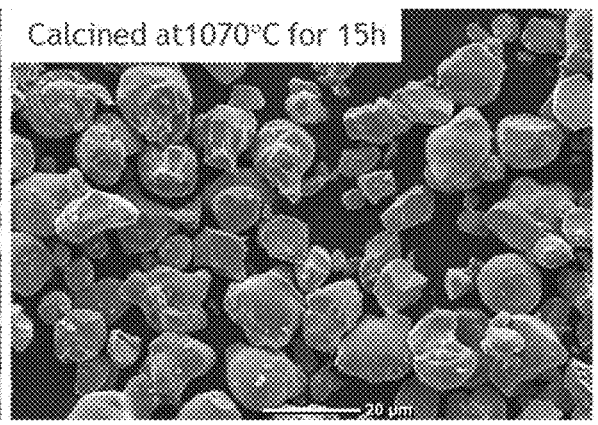
*FIG. 6A*  *FIG. 6B*

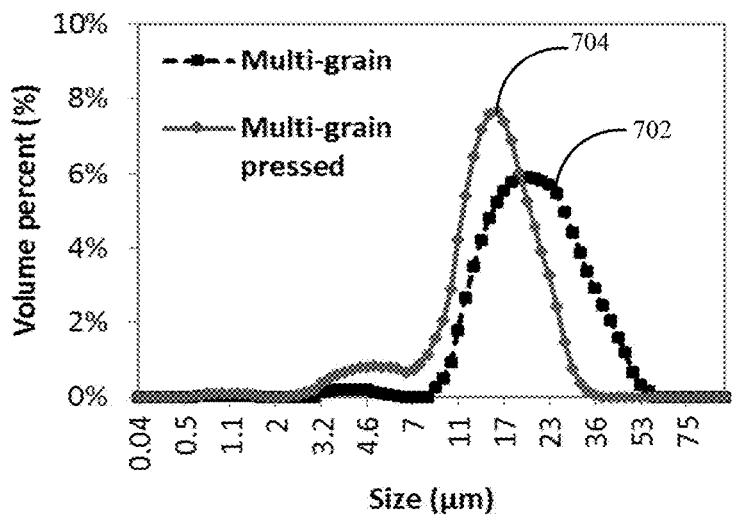
*FIG. 7*
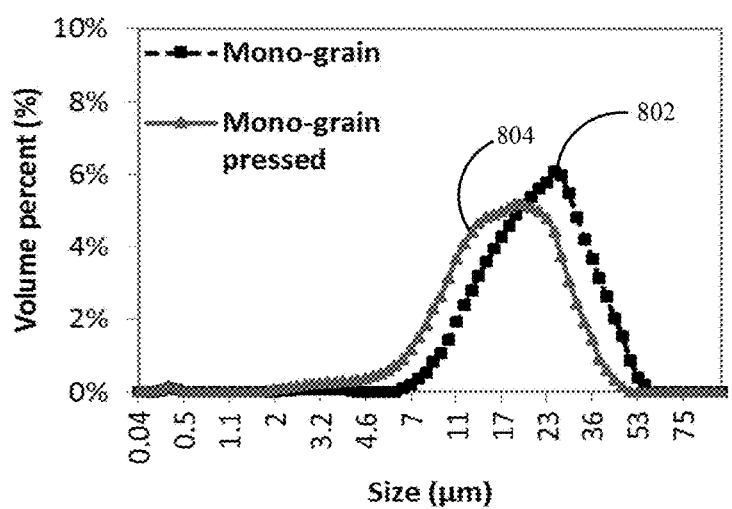
*FIG. 8*
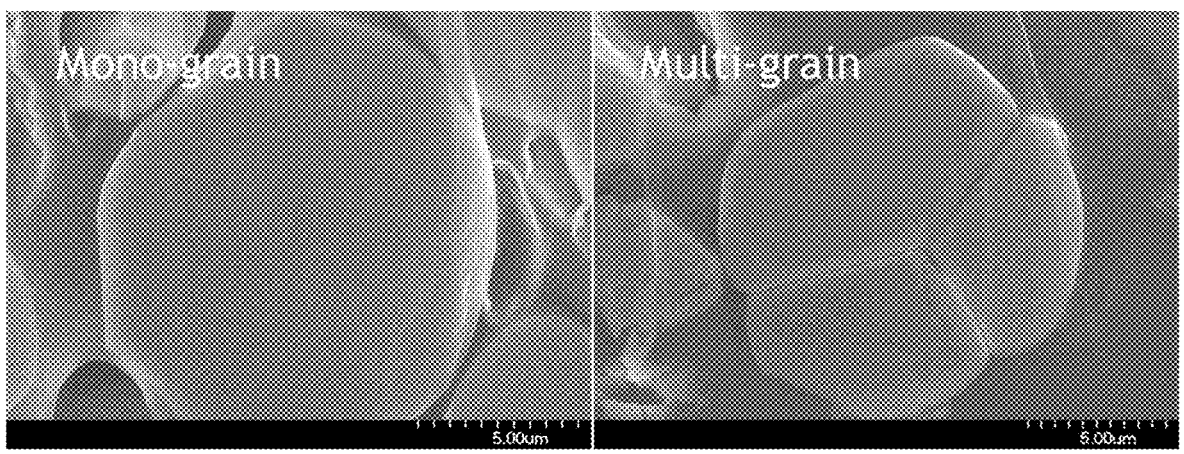
*FIG. 9A*    *FIG. 9B*

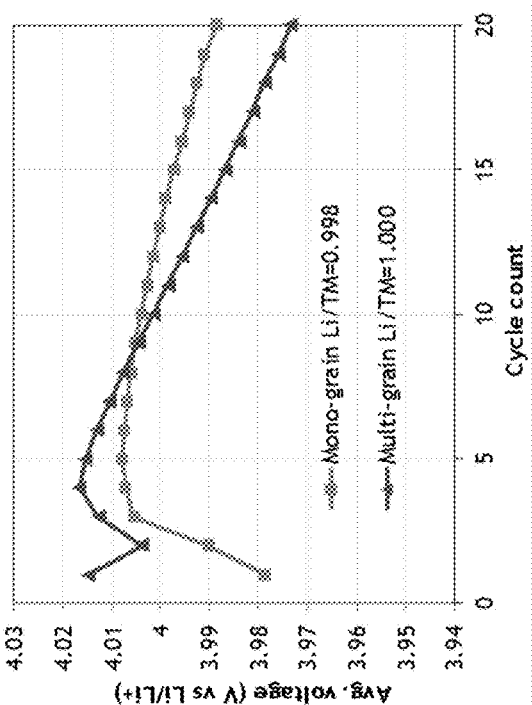
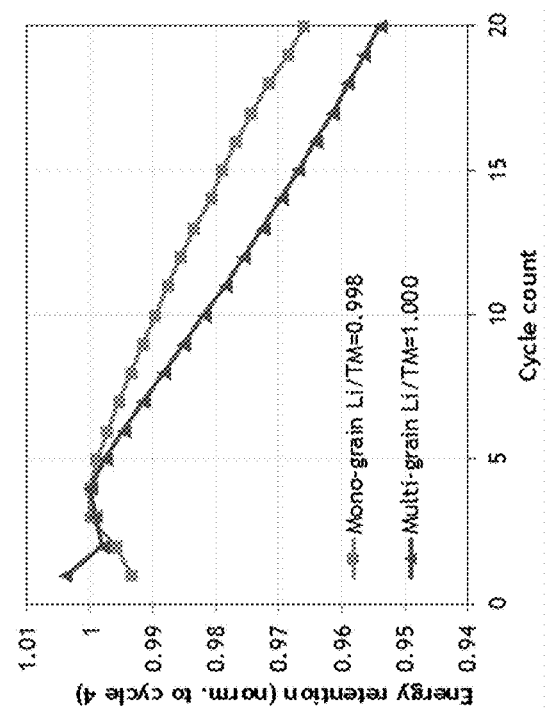
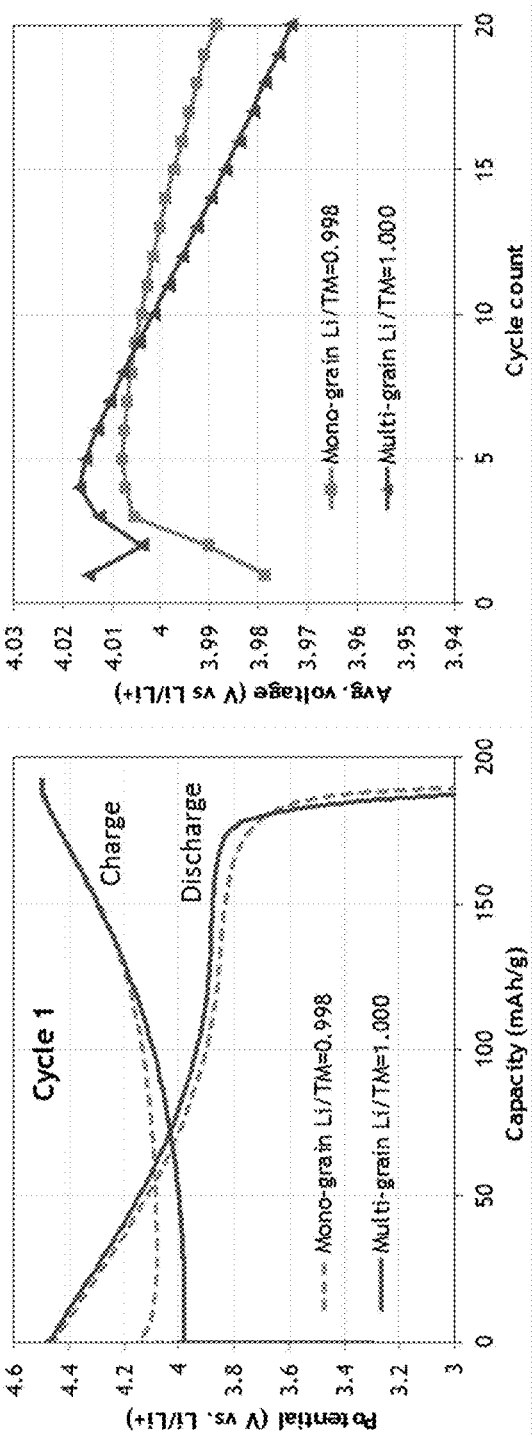
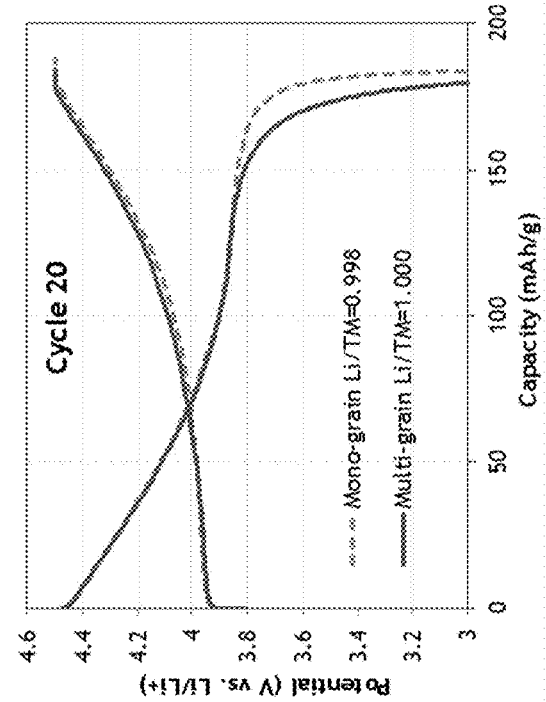

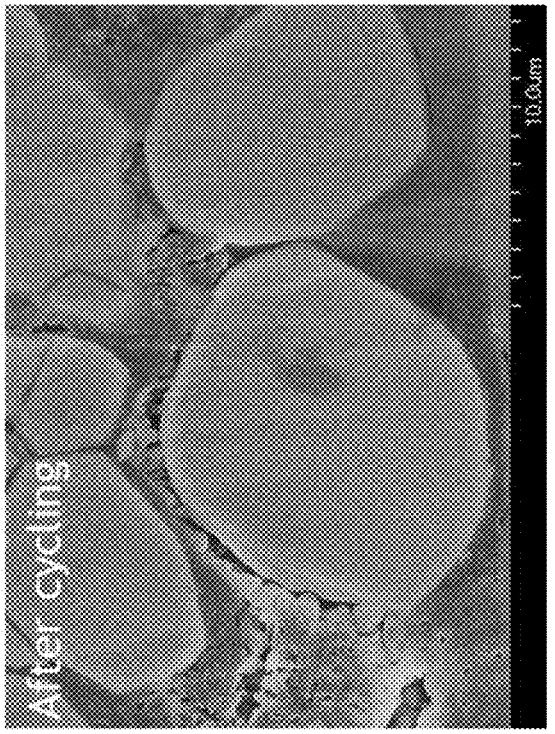
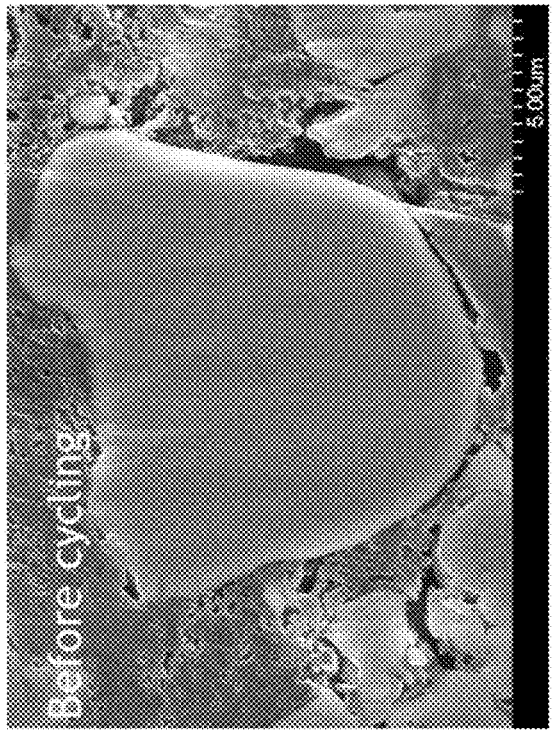
FIG. 11A  FIG. 11B  FIG. 11C  FIG. 11D

MONO-GRAIN CATHODE MATERIALS

CROSS-REFERENCES TO RELATED PATENT APPLICATIONS

This patent application claims the benefit under 35 U.S.C. § 119(e) of U.S. Patent Application Ser. No. 62/889,927, entitled "Mono Grain Cathode Materials," filed on Aug. 21, 2019, which is incorporated herein by reference in its entirety.

This patent application is related to the following patent applications, each of which is incorporated herein by reference in its entirety:

U.S. patent application entitled "Aluminum-Doped Lithium Cobalt Manganese Oxide Batteries," by Hongli Dai et al., filed on Aug. 21, 2020.

U.S. patent application entitled "Cathode Active Materials for Lithium Ion Batteries," by Hongli Dai et al., filed on Aug. 21, 2020.

U.S. GOVERNMENT LICENSE RIGHTS

This disclosure was made with U.S. government support under WFO Proposal No 85F59. This disclosure was made under a CRADA 1500801 between Apple Inc. and Argonne National Laboratory operated for the United States Department of Energy. The U.S. government has certain rights in the disclosure.

FIELD

This disclosure relates generally to batteries, and more particularly to cathode active materials for lithium-ion batteries.

BACKGROUND

As lithium ion battery-powered devices become increasingly small and more powerful, batteries powering these devices need to store more energy in a smaller volume. Consequently, use of battery-powered devices may be facilitated by mechanisms for improving the volumetric energy densities of batteries in the devices.

Lithium cobalt metal oxides or lithium transition metal oxides can be used in cathode active materials for lithium-ion batteries. The lithium transition metal oxides are derivations of lithium cobalt oxide. The lithium cobalt metal oxides or transition metal oxides can be in the form of a powder. There remains a need for improving battery performance.

SUMMARY

In an embodiment, a cathode material may include a plurality of particles, the particles comprising a compound representing by Formula: $Li_\alpha(Co_{1-x-y-z}Mn_xMe_z)Al_yO_\delta$. $0.95<\alpha<1.05$, $x\le1$, $0\le y\le0.03$, $0\le z\le0.05$ and $\delta\approx2$. Me is at least one element selected from B, Na, Mg, P, Ti, Ca, V, Cr, Fe, Ni, Cu, Zn, Sc, Y, Ga, Zr, Ru, Mo, La, Si, Nb, Ge, In, Sn, Sb, Te, and Ce. The particles have a particle size distribution with a D50 ranging from 10 µm to 20 µm.

In another embodiment, a cathode material may include a plurality of particles, the particles comprising a compound representing by Formula: $Li_\alpha(Co_{1-x-y-z}Mn_xNi_z)Al_yO_\delta$, where $0.95<\alpha<1.05$, $x\le1$, $0\le y\le0.03$, $0\le z\le0.05$ and $\delta\approx2$, wherein the particles have a particle size distribution with a D50 ranging from 10 µm to 20 µm.

In another embodiment, a method of making the cathode material is provided. The method may include forming metal oxide precursors and/or hydroxide precursors, wherein the metal oxide precursors and/or hydroxide precursors have a tap density of at least 1.8 g/cc. The method may also include calcinating a mixture of the metal oxide precursors and/or hydroxide precursors and lithium carbonate ($Li_2CO_3$) at a first elevated temperature for a first period of time to produce a first plurality of particles, wherein the particles comprise a compound representing by Formula: $Li_\alpha(Co_{1-x-y-z}Mn_xMe_z)Al_yO_\delta$, where $0.95<\alpha<1.05$, $x\le1$, $0\le y\le0.03$, $0\le z\le0.05$, and $\delta\approx2$, wherein Me is at least one element selected from B, Na, Mg, P Ti, Ca, V, Cr, Fe, Ni, Cu, Zn, Sc, Y, Ga, Zr, Ru, Mo, La, Si, Nb, Ge, in, Sn, Sb, Te, and Ce. The method may further include milling the first plurality of particles to form a second plurality of milled particles. The method may also include coating the second plurality of milled particles with an $Al_2O_3$ coating and annealing the second plurality of milled particles at a second elevated temperature for a second period of time. The method may also include calendering or further milling the annealed second plurality of milled particles to form a third plurality of pressed particles.

In some embodiments, Me is Ni, the Formula is $Li_\alpha(Co_{1-x-y-z}Mn_xNi_z)Al_yO_\delta$.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The disclosure will be readily understood by the following detailed description in conjunction with the accompanying drawings, wherein like reference numerals designate like structural elements, and in which:

FIGS. 3A-F show SEM images of metal hydroxide precursors and corresponding cathode particles with variety of tap densities and particle size distributions: (A) $M(OH)_2$ precursors with tap density of 1.593 g/cc and D50 of 12.6 µm; (B) calcined cathode materials after deagglomeration synthesized from $M(OH)_2$ precursors of FIG. 3A; (C) $M(OH)_2$ precursors with tap density of 1.599 g/cc and D50 of 17.1 µm; (D) calcined cathode materials after deagglomeration synthesized from $M(OH)_2$ precursors of FIG. 3C; (E) $M(OH)_2$ precursors with tap density of 1.711 g/cc and D50 of 14.0 µm; (F) calcined cathode materials after deagglomeration synthesized from $M(OH)_2$ precursors of FIG. 3E, in accordance with illustrative embodiments;

FIGS. 5A-D show SEM images of precursors and cathode materials synthesized from different calcination temperatures with the same metal oxide precursors and/or hydroxide precursors: (A) precursors of tap density of 2.23 g/cc and D50 of 12.86 µm; (B) calcined at 1050° C. for 15 hours; (C) calcined at 1060° C. for 15 hours; (D) calcined at 1070° C. for 15 hours, in accordance with illustrative embodiments;

FIGS. 6A-B show SEM images of cathode materials synthesized from different calcination times using the precursors of FIG. 5A: (A) calcined at 1070° C. for 10 hours; (B) calcined at 1070° C. for 15 hours, in accordance with illustrative embodiments;

FIG. 7 shows the particle size distribution of multi-grain cathode materials before and after pressing to 200 MPa, in accordance with an illustrative embodiment;

FIG. 8 shows the particle size distribution of mono-grain cathode materials before and after pressing to 200 MPa, in accordance with an illustrative embodiment;

FIGS. 9A-B show SEM images: (A) cross section of mono-grain and (B) cross-section of multi-grain particles, in accordance with illustrative embodiments;

FIGS. 10A-D show coin half-cell electrochemical performance comparisons between multi-grain and mono-grain cathode: (A) Cycle 1 potential vs. capacity profile; (B) Average voltage cycle life; (C) Cycle 20 potential vs. capacity profile; (D) Energy retention, in accordance with illustrative embodiments;

FIGS. 11A-D shows cross-section SEM image of mono-grain cathode electrodes showing the integrity of the particles before and after cycles, in accordance with an illustrative embodiment;

DETAILED DESCRIPTION

Figure 1:
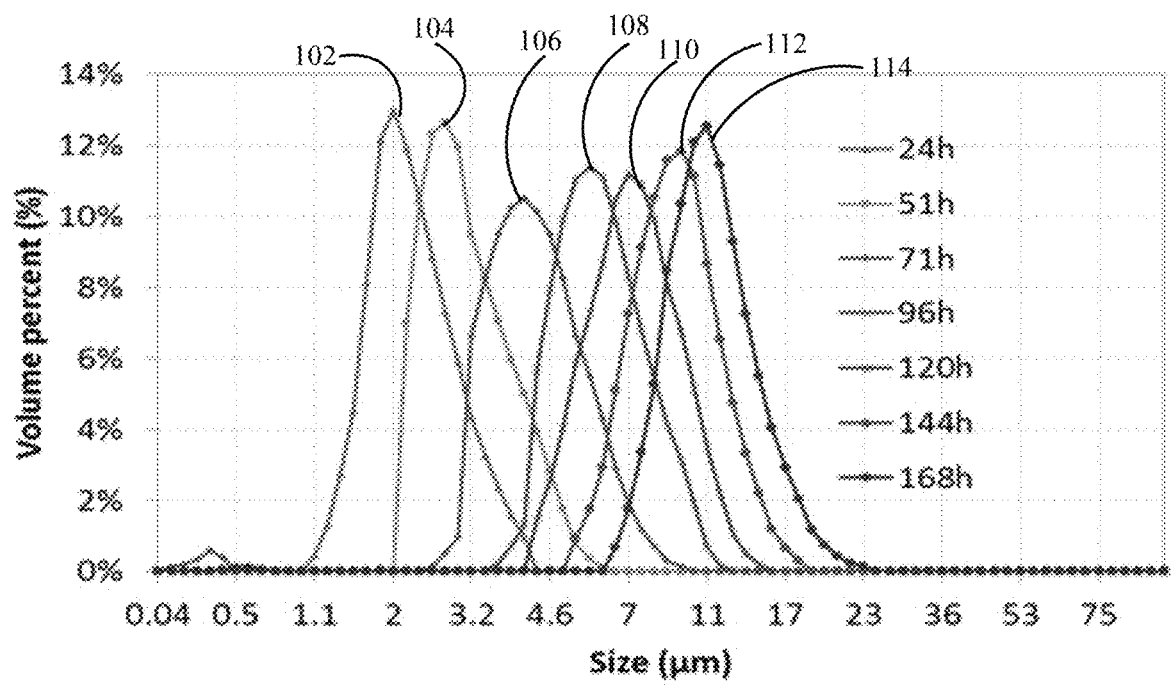
FIG. 1 illustrates particle size distributions of precursor particles at various process times, in accordance with an illustrative embodiment.

The following description is presented to allow any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosure. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Thus, the disclosure is not limited to the embodiments shown, but is to be accorded the widest scope consistent with the principles and features disclosed herein.

As used herein, all compositions referenced for cathode active materials represent those of as-prepared materials (i.e., "virgin" materials) unless otherwise indicated. Materials of these compositions have not yet been exposed to additional processes, such as de-lithiation and lithiation during, respectively, charging and discharging of a lithium-ion battery.

To increase the volumetric energy density of a battery the cathode materials are packed dense via calendering (e.g. roll pressing). This calendering process applies a large rolling force on the cathode particles in the electrode. Cracking occurs along grain boundaries in the cathode particles and shearing (slippage) occurs along the a-b crystal plane (as in shifting a deck of cards) of a grain if the particles do not have sufficient strength. Formation of cracks and shearing of grains may destroy the integrity of the protective coating layer of the cathode material and create new unprotected surfaces, which leads to accelerated degradation of the Li-ion battery performance when exposed to an electrolyte during cycling.

In some aspects, this disclosure provides methods for forming mono-grain or single grain cathode particles with large grain sizes, high packing density, and elemental substitution for increased grain strength to be used in Li-ion batteries.

In some aspects, the disclosed methods relate to improving the particle morphology by making spheroidal or otherwise equiaxial particles with smooth convex surfaces. Equiaxial particles are able to shift around better in the cast electrode during calendering, reducing the force exerted on a given particle during calendering, and leading to higher packing densities. The synthesis of large equiaxial mono-grain particles is not trivial.

In three patent applications, elemental substitutes for cobalt such as manganese have been shown to stabilize the crystal structure of the grains: CATHODE ACTIVE MATERIALS FOR LITHIUM-ION BATTERIES, U.S. Pat. No. 10,164,256 B2; CATHODE ACTIVE MATERIALS FOR LITHIUM-ION BATTERIES, US Patent Publication No. 2017/0263928 A1; and CATHODE ACTIVE MATERIALS FOR LITHIUM-ION BATTERIES, US Patent Publication No. 2017/0263917 A1. Each of the three patent applications is herein incorporated by reference in its entirety. The substitution of Mn into $LiCoO_2$ is observed to decrease grain growth when applying established calcination processes, resulting in multi-grain particles.

This disclosure takes Mn substituted $LiCoO_2$, $Li_\alpha(Co_{1-x-y-z}Mn_xNi_zAl_y)O_\delta$, where $0.95<\alpha<1.05$; $x\leq1.00$, $0\leq y\leq0.03$, $0\leq z\leq0.05$ and $\delta\approx2$, and utilizes high tap density of metal oxide precursors and/or hydroxide precursors, high calcination temperature, and long calcination time to control the production of mono-grain cathode materials. Al is included in the compound for Mn substituted $LiCoO_2$. The total amount of Al including doping and coating is $y\leq0.03$. In the formula, a, x, z, y, and δ for Li, Mn, Ni, Al, and O, respectively, are in mole.

In some variations, a is greater than or equal to 0.95. In some variations, a is greater than or equal to 0.96. In some variations, a is greater than or equal to 0.97. In some variations, a is greater than or equal to 0.98. In some variations, α is greater than or equal to 0.99. In some variations, α is greater than or equal to 1.00. In some variations, α is greater than or equal to 1.01. In some variations, α is greater than or equal to 1.02. In some variations, α is greater than or equal to 1.03. In some variations, a is greater than or equal to 1.04.

In some variations, α is less than 1.05. In some variations, α is less than 1.04. In some variations, α is less than 1.03. In some variations, α is less than 1.02. In some variations, a is less than 1.01. In some variations, α is less than 1.00. In some variations, α is less than or equal to 0.99. In some variations, α is less than or equal to 0.98. In some variations, α is less than or equal to 0.97. In some variations, a is less than or equal to 0.96. It will be understood that a can be any of the variations above, in combination with other variations, and in any combination with any other quantities of any other element in the formulae disclosed herein.

In some variations, $0.95\leq\alpha\leq1.05$. In some variations, $0.96\leq\alpha\leq1.0$. In some variations, $0.97\leq\alpha\leq1.00$. In some variations, $0.98\leq\alpha\leq1.00$. In some variations, $0.98\leq\alpha\leq0.99$. In some variations, $0.97\leq\alpha\leq0.99$. In some variations, $1.00\leq\alpha\leq1.05$. In some variations, $1.00\leq\alpha\leq1.03$. In some variations, $1.00\leq\alpha\leq1.01$.

In some variations, $0<z\leq0.050$. In some variations, z is greater than 0. In some variations, z is greater than or equal to 0.005. In some variations, z is greater than or equal to 0.010. In some variations, z is greater than or equal to 0.015. In some variations, z is greater than or equal to 0.020. In some variations, z is greater than or equal to 0.025. In some variations, z is greater than or equal to 0.030. In some variations, z is greater than or equal to 0.035. In some variations, z is greater than or equal to 0.040. In some variations, z is greater than or equal to 0.045. In some variations, z is less than or equal to 0.050. In some variations, z is less than or equal to 0.045. In some variations, z is less than or equal to 0.040. In some variations, z is less than or equal to 0.035. In some variations, z is less than or equal to 0.030. In some variations, z is less than or equal to 0.025. In some variations, z is less than or equal to 0.020. In some variations, z is less than or equal to 0.015. In some variations, z is less than or equal to 0.010. In some variations, z is less than or equal to 0.005. It will be understood that z can be any of the variations above, in combination with other variations, and in any combination with any other quantities of any other element in the formulae disclosed herein.

In some variations, $0<z\leq0.050$. In some variations, $0.005\leq z\leq0.050$. In some variations, $0.010\leq z\leq0.050$. In some variations, $0.015\leq z\leq0.050$. In some variations, $0.020\leq z\leq0.050$. In some variations, $0.025\leq z\leq0.050$. In some variations, $0.025\leq z\leq0.035$.

In some variations, $0\leq y\leq0.040$. In some variations, y is equal to or greater than 0. In some variations, y is equal to greater than or equal to 0.005. In some variations, y is equal to greater than or equal to 0.010. In some variations, y is equal to greater than or equal to 0.015. In some variations, y is equal to greater than or equal to 0.020. In some variations, y is equal to greater than or equal to 0.025. In some variations, y is greater than or equal to 0.030. In some variations, y is greater than or equal to 0.035. In some variations, y is less than or equal to 0.040. In some variations, y is less than or equal to 0.035. In some variations, y is less than or equal to 0.030. In some variations, y is less than or equal to 0.025. In some variations, y is less than or equal to 0.020. In some variations, y is less than or equal to 0.015. In some variations, y is less than or equal to 0.010. In some variations, y is less than or equal to 0.005. It will be understood that y can be any of the variations above, in combination with other variations, and in any combination with any other quantities of any other element in the formulae disclosed herein.

In some variations, $0<y\leq0.040$. In some variations, $0<y\leq0.030$. In some variations, $0<y\leq0.025$. In some variations, $0.005\leq y\leq0.030$. In some variations, $0.010\leq y\leq0.030$. In some variations, $0.015\leq y\leq0.030$. In some variations, $0.015\leq y\leq0.025$.

In some variations, $x\leq1$. In some variations, z is less than or equal to 1. In some variations, z is less than or equal to 0.9. In some variations, z is less than or equal to 0.8. In some variations, z is less than or equal to 0.7. In some variations, z is less than or equal to 0.6. In some variations, z is less than or equal to 0.5. In some variations, z is less than or equal to 0.4. In some variations, z is less than or equal to 0.3. In some variations, z is less than or equal to 0.2. In some variations, z is less than or equal to 0.1. It will be understood that z can be any of the variations above, in combination with other variations, and in any combination with any other quantities of any other element in the formulae disclosed herein.

In some variations, $1.90\leq\delta\leq2.10$. In some variations, δ is greater than or equal to 1.90. In some variations, δ is greater than or equal to 1.92. In some variations, δ is greater than or equal to 1.94. In some variations, δ is greater than or equal to 1.96. In some variations, δ is greater than or equal to 1.98. In some variations, δ is greater than or equal to 2.00. In some variations, δ is greater than or equal to 2.02. In some variations, δ is greater than or equal to 2.04. In some variations, Bis greater than or equal to 2.06. In some variations, Bis greater than or equal to 2.08. In some variations, Bis less than or equal to 2.10. In some variations, Bis less than or equal to 2.08. In some variations, Bis less than or equal to 2.06. In some variations, Bis less than or equal to 2.04. In some variations, δ is less than or equal to 2.02. In some variations, δ is less than or equal to 2.00. In some variations, δ is less than or equal to 1.98. In some variations, δ is less than or equal to 1.96. In some variations, δ is less than or equal to 1.94. In some variations, δ is less than or equal to 1.92. It will be understood that δ can be any of the variations above, in combination with other variations, and in any combination with any other quantities of any other element in the formulae disclosed herein.

In some variations, 1.92≤δ≤2.08. In some variations, 1.94≤δ≤2.06. In some variations, 1.96≤δ≤2.04. In some variations, 1.98≤δ≤2.02.

This disclosure also demonstrates the increased cycle life of mono-grain cathode materials. Without wishing to be held to a particular mechanism or mode of action, improved cycle life can result from increased particle strength and reduced cracking by preserving the integrity of the protective layer. Multi-grain cathode materials break apart and shear during the calendering process by comparison. The mono-grain cathode materials are defined as having a distribution of particles where at least 70% of the total material including secondary particles (groups of grains bonded together with three or fewer grains. In contrast, multi-grain cathode materials are defined as having a distribution of secondary particles comprised of four or more agglomerated grains. The presence of multi-grain materials in a material can degrade the cycle life performance by introducing particles that are susceptible to fracture and exposure of fresh surfaces that can react with the electrolyte.

In some variations, at least 75% of the total material including secondary particles (groups of grains bonded together) with three or fewer grains. In some variations, at least 80% of the total material including secondary particles (groups of grains bonded together) with three or fewer grains. In some variations, at least 85% of the total material including secondary particles (groups of grains bonded together) with three or fewer grains. In some variations, at least 90% of the total material including secondary particles (groups of grains bonded together) with three or fewer grains. In some variations, at least 95% of the total material including secondary particles (groups of grains bonded together) with three or fewer grains.

In some variations, the metal oxide precursors and/or hydroxide precursors have a tap density of at least 1.8 g/cc. In some variations, the metal oxide precursors and/or hydroxide precursors have a tap density of at least 1.9 g/cc. In some variations, the metal oxide precursors and/or hydroxide precursors have a tap density of at least 2.0 g/cc. In some variations, the metal oxide precursors and/or hydroxide precursors have a tap density of at least 2.1 g/cc. In some variations, the metal oxide precursors and/or hydroxide precursors have a tap density of at least 2.2 g/cc. In some variations, the metal oxide precursors and/or hydroxide precursors have a tap density of at least 2.3 g/cc. In some variations, the metal oxide precursors and/or hydroxide precursors have a tap density of at least 2.4 g/cc. In some variations, the metal oxide precursors and/or hydroxide precursors have a tap density of at least 2.5 g/cc. In some variations, the metal oxide precursors and/or hydroxide precursors have a tap density of at least 2.6 g/cc. In some variations, the metal oxide precursors and/or hydroxide precursors have a tap density of at least 2.7 g/cc. In some variations, the metal oxide precursors and/or hydroxide precursors have a tap density of at least 2.8 g/cc. In some variations, the metal oxide precursors and/or hydroxide precursors have a tap density of at least 2.9 g/cc. Tap density is calculated based on powder weight and its taped volume from tap density machine. The tap density is measured by filling a graduated cylinder with a known weight of powder and repeatedly lifting the cylinder to a fixed height (about 3-5 mm) and dropping (tapping) it on a surface to pack the powder. This action is repeated (about 2000 times) until the level of the powder in the graduated cylinder reaches a constant value. The powder weight divided by the value of its packed volume constitutes the tap density.

The particle size distribution is determined by using a laser scattering technique. Using this method, a small amount of powder (e.g. about 1 g) is dispersed in water using ultrasonic vibration. This slurry is pumped through a glass cell where a laser is focused. The scattering of the laser is captured on a 2-D detector and the particle size is determined for individual particles assuming the particles have a spherical volume. The D50 is the median value of the particle size distribution. D90 is the 90% value of the largest particle size. D99 is the 99% value of the largest particle size. D10 is the 10% value of the largest particle size.

In some variations, the metal oxide precursors and/or hydroxide precursors have a D50 of at least 7.0 μm. In some variations, the metal oxide precursors and/or hydroxide precursors have a D50 of at least 8.0 μm. In some variations, the metal oxide precursors and/or hydroxide precursors have a D50 of at least 9.0 μm. In some variations, the metal oxide precursors and/or hydroxide precursors have a D50 of at least 10.0 μm.

In some embodiments, the calcination temperature is equal to or greater than 950° C. In some embodiments, the calcination temperature is equal to or greater than 1000° C. In some embodiments, the calcination temperature is equal to or greater than 1050° C. In some embodiments, the calcination temperature is equal to or greater than 1070° C. In some embodiments, the calcination temperature is equal to or greater than 1080° C. In some embodiments, the calcination temperature is equal to or greater than 1090° C.

In some embodiments, the calcination temperature is equal to or less than 1100° C. In some embodiments, the calcination temperature is equal to or less than 1090° C. In some embodiments, the calcination temperature is equal to or less than 1080° C. No more than 1200° C. is used to avoid impurity phase generation. In some embodiments, the calcination temperature is equal to or less than 1060° C. In some embodiments, the calcination temperature is equal to or less than 1050° C. In some embodiments, the calcination temperature is equal to or less than 1000° C.

In some embodiments, the calcination time is equal to or greater than 5 hours. In some embodiments, the calcination time is equal to or greater than 10 hours. In some embodiments, the calcination time is equal to or greater than 15 hours. In some embodiments, the calcination time is equal to or greater than 20 hours. In some embodiments, the calcination time is equal to or greater than 25 hours. It will be appreciated by those skilled in the art that the time can be shortened based upon temperature and particle size or morphology. For example, the minimum calcination time is shorter than 15 hours when the calcination temperature increases to 1080° C. In some embodiments, the calcination time is reduced when the calcination temperature is increased, so that at 1100° C., the calcination time can be reduced to zero hours.

The mono-grain cathode materials have narrow particle size distributions and also are less affected by calendering than the multi-grain cathode materials.

In some variations, the delta D50 due to calendering is equal to or less than 12% for the mono-grain cathode material. In some variations, the delta D50 due to calendering is equal to or less than 10% for the mono-grain cathode material. In some variations, the delta D50 due to calendering is equal to or less than 8% for the mono-grain cathode material. In some variations, the delta D50 due to calendering is equal to or less than 6% for the mono-grain cathode material.

In some variations, the D50 is equal to or less than 20 μm for the mono-grain cathode material. In some variations, the D50 is equal to or less than 19 μm for the mono-grain cathode material. In some variations, the D50 is equal to or less than 18 μm for the mono-grain cathode material. In some variations, the D50 is equal to or less than 17 μm for the mono-grain cathode material. In some variations, the D50 is equal to or less than 16 μm for the mono-grain cathode material. In some variations, the D50 is equal to or less than 15 μm for the mono-grain cathode material. In some variations, the D50 is equal to or less than 14 μm for the mono-grain cathode material. In some variations, the D50 is equal to or less than 13 μm for the mono-grain cathode material. In some variations, the D50 is equal to or less than 12 μm for the mono-grain cathode material. In some variations, the D50 is equal to or less than 11 μm for the mono-grain cathode material.

In some variations, the D50 is equal to or greater than 11 μm. In some variations, the D50 is equal to or greater than 12 μm. In some variations, the D50 is equal to or greater than 13 μm. In some variations, the D50 is equal to or greater than 14 μm. In some variations, the D50 is equal to or greater than 15 μm. In some variations, the D50 is equal to or greater than 16 μm. In some variations, the D50 is equal to or greater than 17 μm. In some variations, the D50 is equal to or greater than 18 μm. In some variations, the D50 is equal to or greater than 19 μm.

In some variations, the D90 is equal to or less than 30 μm for the mono-grain cathode material. In some variations, the D90 is equal to or less than 25 μm for the mono-grain cathode material. In some variations, the D90 is equal to or greater than 20 μm. In some variations, the D90 is equal to or greater than 25 μm.

In some variations, the D99 is equal to or less than 35 μm for the mono-grain cathode material. In some variations, the D99 is equal to or less than 30 μm for the mono-grain cathode material. In some variations, the D99 is equal to or greater than 25 μm. In some variations, the D90 is equal to or greater than 30 μm.

In some variations, the D10 is equal to or less than 8 μm for the mono-grain cathode material. In some variations, the D10 is equal to or less than 7.5 μm for the mono-grain cathode material. In some variations, the D10 is equal to or less than 7.0 μm for the mono-grain cathode material. In some variations, the D10 is equal to or less than 6.5 μm for the mono-grain cathode material. In some variations, the D10 is equal to or less than 6.0 μm for the mono-grain cathode material.

In some variations, the delta D99 due to calendering is equal to or less than 40%. In some variations, the delta D99 due to calendering is equal to or less than 35%. In some variations, the delta D99 due to calendering is equal to or less than 30%. In some variations, the delta D99 due to calendering is equal to or less than 25%.

Batteries including the mono-grain cathode materials have improved battery performance over the multi-grain cathode materials.

In some variations, the batteries formed of mono-grain cathode active materials have a three-cycle specific capacity of at least 178.5 mAh/g at 25° C. in some variations, the batteries formed of mono-grain cathode active materials have a three-cycle specific capacity of at least 179 mAh/g at 25° C. In some variations, the batteries formed of mono-grain cathode active materials have a three-cycle specific capacity of at least 179.5 mAh/g at 25° C., In some variations, the batteries formed of mono-grain cathode active materials have a three-cycle specific capacity of at least 180 mAh/g at 25° C. In some variations, the batteries formed of mono-grain cathode active materials have a three-cycle specific capacity of at least 181 mAh/g at 25° C.

In some variations, the batteries formed of mono-grain cathode active materials have a three-cycle specific capacity of at least 182 mAh/g at 45° C. In some variations, the batteries formed of mono-grain cathode active materials have a three-cycle specific capacity of at least 182.5 mAh/g at 45° C. In some variations, the batteries formed of mono-grain cathode active materials have a three-cycle specific capacity of at least 183 mAh/g at 45° C. In some variations, the batteries formed of mono-grain cathode active materials have a three-cycle specific capacity of at least 184 mAh/g at 45° C. In some variations, the batteries formed of mono-grain cathode active materials have a three-cycle specific capacity of at least 185 mAh/g at 45° C.

In some variations, the batteries formed of mono-grain cathode active materials have a three-cycle RSS equal to or less than 53 ohms-cm$^2$ at 25° C. In some variations, the batteries formed of mono-grain cathode active materials have a three-cycle RSS equal to or less than 52 ohms-cm$^2$ at 25° C. In some variations, the batteries formed of mono-grain cathode active materials have a three-cycle RSS equal to or less than 51 ohms-cm$^2$ at 25° C. In some variations, the batteries formed of mono-grain cathode active materials have a three-cycle RSS equal to or less than 50 ohms-cm' at 25° C.

In some variations, the batteries formed of mono-grain cathode active materials have a three-cycle RSS equal to or less than 27 ohms-cm' at 45° C. In some variations, the batteries formed of mono-grain cathode active materials have a three-cycle RSS equal to or less than 27.5 ohms-cm$^2$ at 45° C. In some variations, the batteries formed of mono-grain cathode active materials have a three-cycle RSS equal to or less than 26 ohms-cm$^2$ at 45° C. In some variations, the batteries formed of mono-grain cathode active materials have a three-cycle RSS equal to or less than 25.5 ohms-cm' at 45° C.

EXAMPLES

The following examples are for illustration purposes only. It will be apparent to those skilled in the art that many modifications, both to materials and methods, may be practiced without departing from the scope of the disclosure. The following examples demonstrate how mono-grain cathode particles are produced and how the mono-grain cathode materials show enhanced physical and electrochemical properties over multi-grain particles.

Example 1: Dense Precursors for Producing Mono-Grain Particles

A Continuous Stirred Tank Reactor (CSTR) was used to coprecipitate metal hydroxides or mixed-metal hydroxides and oxides, which are used as precursors to synthesize mono-grain cathode materials. The coprecipitation process helps achieve better physical properties such as size, shape, morphology, and consequently packing density of these particles.

The CSTR was set up to produce a precursor powder used for the synthesis of $Li_\alpha(Co_{0.97}Mn_{0.03})O_\delta$, where $0.95<\alpha<1.05$ and $\delta\approx2$. In general, a metal salt feed solution was prepared by mixing the desired proportions of $CoSO_4*7H_2O$ and $MnSO_4*H_2O$ into deionized water to make a solution of 1.0 to 2.0 molar (M). Either ammonium hydroxide ($NH_4OH$, 2-5 M) or ethylenediaminetetraacetic acid (EDTA, 0.01-0.02 M) is used as a chelating agent. A 5 L CSTR was filled with distilled water and heated (or cooled) at temperatures ranging from 20 to 75° C. The co-precipitate slurry was stirred in the reactor at a desired rate between 800-1500 rpm, and was purged with nitrogen to produce hydroxide particles or air to produce oxide particles. By controlling the feed rate of the metal sulfate solution (0.05-0.2 L/h), the feed rate of chelating agent (0.05-0.2 L/h), the pH (9.5-12.0), temperature (20 to 75° C.) and stir rate (800-1500 rpm), precursors with different morphologies, densities, and particle size distributions can be obtained. The resulting powder materials were washed in distilled water to remove the salt residue and dried for storage.

Table 1 lists an example of reactor conditions using EDTA as a chelating agent. Under these conditions, the particles grow with time to have a narrow particle size distribution.

TABLE 1

| Parameters | P291.M3 |
| --- | --- |
| Target composition | $Co_{0.97}Mn_{0.03}$ |
| Reactor working volume, L | 3.25 |
| Gas and flow rate, L/min | Air/4 |
| Chelating agent | EDTA |
| Stir rate, rpm | 1100 |
| Temperature, ° C. | 70 |
| pH | 9.5 |
| Residence time, h | 20.2 |
| $MSO_4$ concentration, M | 1 |
| Chelate concentration, M | 0.01 |
| NaOH concentration, M | 4 |
| $MSO_4$ flow rate, L/h | 0.107 |
| Chelate flow rate, L/h | 0.107 |
| NaOH flow rate, L/h | 0.054 |
| Chelate/M ratio | 0.01 |
| Tap density, g/cc | 2.35 (120-144 h) |
| D10, µm | 5.64 |
| D50, µm | 7.73 |
| D90, µm | 11.03 |
| D99, µm | 14.50 |

The D50 increases with the reactor running time. FIG. 1 illustrates the particle size distribution of metal oxide precursor and/or hydroxide precursor samples collected from the CSTR with increasing reactor running time. The precursor can be in the form of $M(OH)_2$, MOOH, $M_xO_y$, or their combination, where M is Co, Mn, Ni, and Al among others. The precursor particles contained a mixture of $Co_{0.97}Mn_{0.03}O_\delta$, where $1.3\leq\delta\leq2.0$ and $Co_{0.97}Mn_{0.03}(OH)_2$.

The particle size distribution 102 after 24 hours has a D50 (the intercept of 50% of the cumulative volume distribution) of about 2 µm with particle sizes ranging from 1 µm to 5 µm. The particle size distribution 104 represents running time of 51 hours. The particle size distribution 106 represents running time of 71 hours. The particle size distribution 108 represents running time of 96 hours. The particle size distribution 110 represents running time of 120 hours. The particle size distribution 112 represents running time of 144 hours. The particle size distribution 114 represents running time of 168 hours. As shown in FIG. 1, the D50 ultimately increases to about 11 µm at 168 hours of running time, where the particle size ranges from 6 µm to 23 µm.

Figure 2:
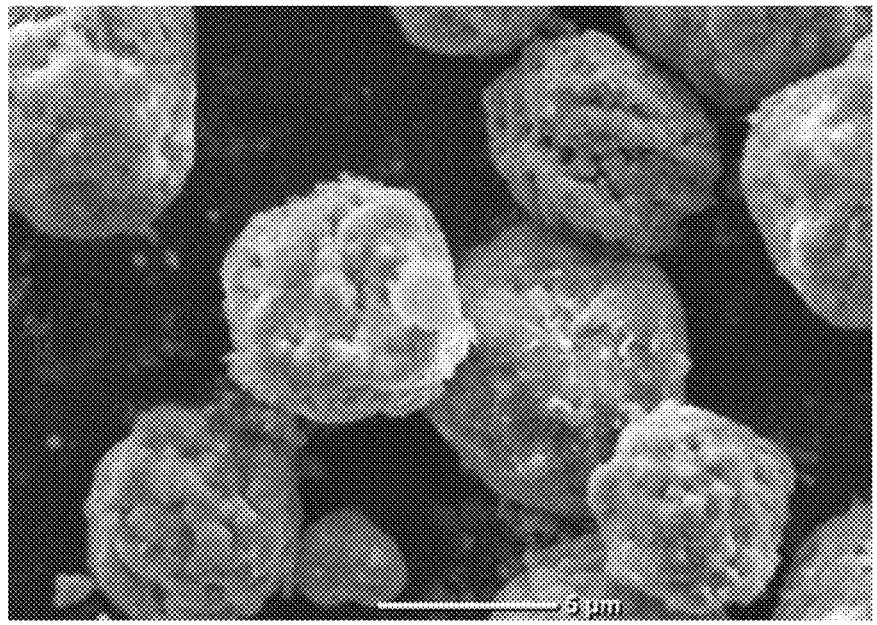
FIG. 2 shows a SEM image of particles collected from the process described in Table 1, in accordance with an illustrative embodiment.

To characterize the surface of the particles, sample particles were examined using Scanning Electron Microscopy (SEM). FIG. 2 shows SEM image of sample particles that have been growing in the reactor from 120 hours to 144 hours. The particles have a particle size D50 of 7.73 µm based on laser scattering and a tap density of 2.35 g/cc. The D50 is listed in Table 1. The particle size distribution was determined using a laser scattering technique.

A batch of metal hydroxide $M(OH)_2$ precursors was produced by replacing EDTA with $NH_4OH$ as the chelating agent and bubbling $N_2$ into the reactor. These $M(OH)_2$ precursors were first blended with lithium carbonate ($Li_2CO_3$) using Li/TM ratio within the range 0.95-1.05 and then calcined at 1070° C. for 15 hours, where TM stands for transition metal. Precursors with different tap densities were obtained in this batch.

FIGS. 3A-F show SEM images of metal hydroxide precursors and corresponding cathode particles with variety of tap densities and particle size distributions: (A) $M(OH)_2$ precursors with a tap density of 1.593 g/cc and a D50 of 12.6 µm, in accordance with an illustrative embodiment; (B) calcined cathode materials after deagglomeration synthesized from $M(OH)_2$ precursors of FIG. 3A, in accordance with an illustrative embodiment; (C) $M(OH)_2$ precursors with a tap density of 1.599 g/cc and a D50 of 17.1 µm, in accordance with an illustrative embodiment; (D) calcined cathode materials after deagglomeration synthesized from $M(OH)_2$ precursors of FIG. 3C, in accordance with an illustrative embodiment; (E) $M(OH)_2$ precursors with a tap density of 1.711 g/cc and a D50 of 14.0 µm, in accordance with an illustrative embodiment; (F) calcined cathode materials after deagglomeration synthesized from $M(OH)_2$ precursors of FIG. 3E, in accordance with an illustrative embodiment.

Example 2: Milling Processes for Producing Mono-Grain Particles

In order to obtain separated mono-grain particles, the calcined cathode particles are subjected to deagglomeration by die pressing or by a light ball milling process.

Mono-grain particles were prepared by adding 2 g of powder to a 13 mm pellet die and uniaxially pressing the powder from 200 MPa to 470 MPa, crushing the weak bonds that connect particles together and breaking particles along their grain boundaries. This approach was used to demonstrate the concept and is not practical for large batches, so a light milling process was also employed.

Mono-grain particles were prepared by planetary ball-milling using Retsch PM200 instrument. A batch of 30 g of multiple grain cathode powder and 90 g of 2 mm to 5 mm agate milling media were placed in a 125 mL agate milling jar. The mixture was milled for 5 to 30 minutes, preferably 12 minutes at 200 rpm to 300 rpm to break up the weak connections along the grains. The powder was sieved through a 325 mesh sieve to separate milling media from powder and to remove large left-over particle agglomerates.

To characterize the powder, sample particles were cross-sectioned and examined using SEM. FIGS. 4A-F show SEM images of precursors and corresponding cathodes with variety of densities and particle size distributions: (A) the cross-section of the metal oxide precursors and/or hydroxide precursors with a tap density of 2.23 g/cc and a D50 of 12.86 μm; (B) the corresponding cathode materials synthesized from the precursors of FIG. 4A; (C) the cross-section of the metal oxide precursors and/or hydroxide precursors with a tap density of 2.33 g/cc and a D50 of 14.23 μm; (D) the corresponding cathode materials synthesized from the precursors of FIG. 4C; (E) the cross-section of the metal oxide precursors and/or hydroxide precursors with a tap density of 2.93 g/cc and a D50 of 14.15 μm; (F) the corresponding cathode materials synthesized from the precursors of FIG. 4E; in accordance with an illustrative embodiment.

Figure 4A:
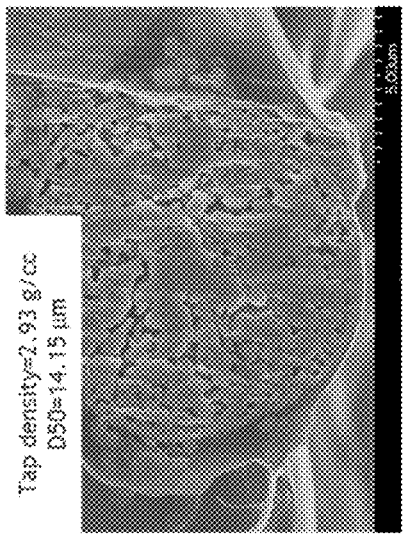
FIGS. 4A-F show SEM images of precursors and corresponding cathodes with variety of densities and particle size distributions: (A) the cross-section of the metal oxide precursors and/or hydroxide precursors with tap density of 2.23 g/cc and D50 of 12.86 µm; (B) the corresponding cathode materials synthesized from the precursors of FIG. 4A; (C) the cross-section of the metal oxide precursors and/or hydroxide precursors with tap density of 2.33 g/cc and D50 of 14.23 µm; (D) the corresponding cathode materials synthesized from the precursors of FIG. 4C; (E) the cross-section of the metal oxide precursors and/or hydroxide precursors with tap density of 2.93 g/cc and D50 of 14.15 µm; (F) the corresponding cathode materials synthesized from the precursors of FIG. 4E; in accordance with illustrative embodiments.

As shown in FIGS. 4A, C, and E (all having the same magnifications), these SEM images of the cross-sections of the metal oxide precursors and/or metal hydroxide precursors $M(OH)_2$, where M stands for metal element, such as Co, Mn with different tap densities show mono-grain particles. In the coprecipitation process only Co and Mn sulfates can be coprecipitated together. Aluminum sulfate cannot be coprecipitated without complications and therefore aluminum was added during the lithiation/calcination process or in a later coating process.

Figure 4B:
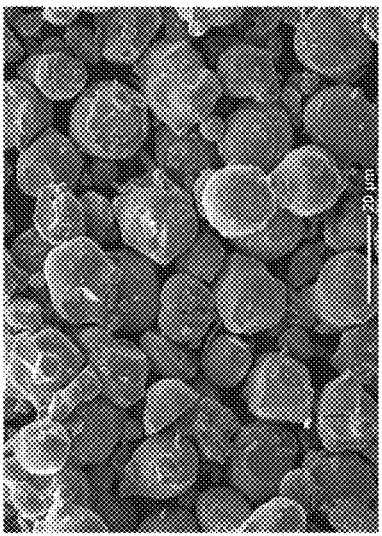
Figure 4C:
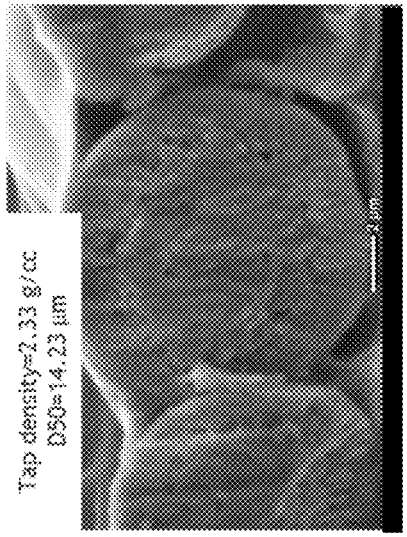
Figure 4D:
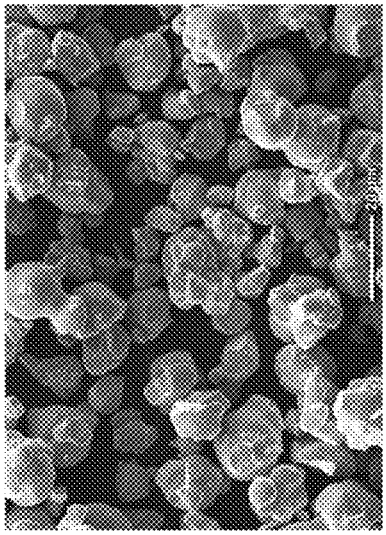
Figure 4E:
Figure 4F:
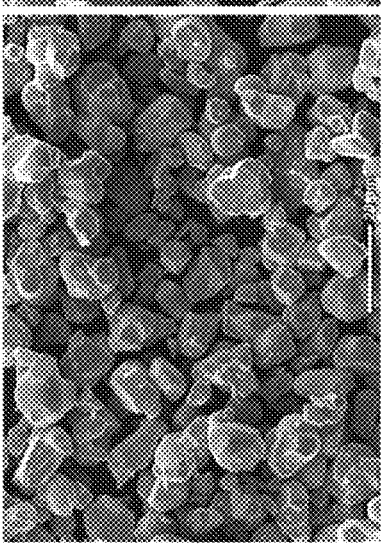

As shown in FIGS. 4B, D, and F (all having the same magnifications), the surfaces of the corresponding cathode materials synthesized from the metal oxide precursors and/or hydroxide precursors become smoother with higher tap densities and more dense precursors. The smooth surfaces characterize high energy density cathode materials.

It is easier to synthesize mono-grain cathode materials using metal oxide precursors and/or metal hydroxide precursors with high tap densities. In addition, mono-grain cathode materials synthesized from the dense metal oxide precursors and/or hydroxide precursors have a smooth surface, which allows for particle flow and rearrangement for dense packing during the laminate calendering process.

Example 3: High Calcination Temperature and Long Calcination Time for Producing Mono-Grain Particles It is also important to control the calcination process parameters to obtain mono-grain cathode materials. A metal oxide precursor and/or a hydroxide precursor (e.g. $M(OH)_2$) with a tap density of 2.33 g/cc was blended with lithium carbonate ($Li_2CO_3$) using 1.02 as Li/TM ratio and calcined at different temperatures (1050 to 1070° C.) with different hold-times (10 to 15 hours).

FIGS. 5A-D show SEM images of precursors and cathode materials synthesized at different calcination temperatures with metal oxide precursors and/or hydroxide precursors: (A) precursors with a tap density of 2.23 g/cc and a D50 of 12.86 μm, in accordance with an illustrative embodiment; (B) calcined at 1050° C. for 15 hours, in accordance with an illustrative embodiment; (C) calcined at 1060° C. for 15 hours, in accordance with an illustrative embodiment; (D) calcined at 1070° C. for 15 hours, in accordance with an illustrative embodiment. As shown in FIGS. 5B-D, increased calcination temperature improves the fraction of mono-grain particles within a distribution.

FIGS. 6A-B show SEM images of cathode materials synthesized from different calcination times using the precursors off FIG. 5A: (A) calcined at 1070° C. for 10 hours, in accordance with an illustrative embodiment; (B) calcined at 1070° C. for 15 hours, in accordance with an illustrative embodiment. As shown in FIGS. 6A-B, increased calcination time also improves the fraction of mono-grain particles within a distribution.

As shown above, higher calcination temperatures (equal to or greater than 1070° C.) and longer calcination times (equal to or greater than 15 hours) may be needed to synthesize mono-grain particles. Lower calcination temperatures and shorter calcination times would generate multi-grain cathode materials.

In some variations, the desirable calcination temperature and time were found to be 1070° C. for 15 hours.

Example 4: Physical Properties of Mono-Grain and Multi-Grain Cathode Materials

Hydroxide precursors prepared as described before were blended with lithium carbonate ($Li_2CO_3$). To obtain multi-grain particles, the precursor mixture was calcined at 1050° C. for 15 hours to produce $Li_{1.00}(Co_{0.97}Mn_{0.03})O_2$ powder including multi-grain particles. The powder was subsequently pressed in a die at 200 MPa to produce pressed powder, analogous to the effective pressure observed during the laminate calendering process.

To obtain mono-grain particles, the precursor mixture was calcined at 1070° C. for 15 hours to produce $Li_{1.00}(Co_{0.97}Mn_{0.03})O_2$ powder comprising mono-grain particles, i.e. as-sintered powder. This as-sintered powder was also pressed in a die at 200 MPa to produce pressed powder.

FIG. 7 shows the particle size distribution of multi-grain cathode materials before and after pressing to 200 MPa, in accordance with an illustrative embodiment. Curve 702 represents the particle size distribution for an as-sintered powder, while curve 704 represents the particle size distribution for a pressed powder. As shown by curve 702, the particle size distribution of the as-sintered powder had a D10 of 12 μm, a D50 of 20 μm, a D90 of 34 μm, and a D99 of 47 μm. As shown by curve 704, the particle size after pressing was reduced to a D10 of 7 μm, a D50 of 14 μm, a D90 of 22 μm, and a D99 of 29 μm. Note that the D99 was reduced from 47 μm to 29 μm by 64%.

As can be seen by the change in particle size distribution, when a laminate made with these particles is calendered, the largest size (D99) particles may break down into the smallest size particles (D10). If this is done after the particles have been coated, then fresh unprotected surfaces will be generated. When the pressed particles were mixed with smaller filler particles having a D50 of 8 μm, the mixture could achieve a pellet density of 3.86 g/cc when it was uniaxially pressed to 200 MPa.

FIG. 8 shows the particle size distribution of mono-grain cathode materials before and after pressing under a pressure of 200 MPa, which is a typical pressure exerted on cathode laminates. Curve 802 represents the particle size distribution of the mono-grain cathode materials before pressing, while curve 804 represents the particle size distribution of the pressed mono-grain cathode material. As shown by curve 802, the particle size distribution of the mono-grain cathode material before pressing was a D10 of 11 μm, a D50 of 22 μm, a D90 of 36 μm, and a D99 of 48 μm. As shown by curve 804, the pressed powder has a reduced particle size, i.e. a D10 of 7 μm, a D50 of 15 μm, a D90 of 28 μm, and a D99 of 38 μm.

As shown in FIG. 8, the D99 of the mono-grain cathode material was reduced from 48 μm to 38 μm by 28%. This smaller size reduction of the largest particles, indicative of stronger particles, is due to the higher calcination temperature and the mono-grain particle morphology of the mono-grain cathode material.

The number of small particles increases more dramatically for the multi-grain cathode material as compared to the mono-grain cathode material. When laminates made from the multi-grain cathode materials are calendered, there will be more fracturing of multi-grain particles, which results in increased unprotected cathode surface area.

The milled powder contains mainly mono-grain particles. When these mono-grain particles are coated, laminated, and calendered at 200 MPa, further breakage is mitigated. These mono-grain particles can be mixed with smaller filler particles having a D50 of 8 μm to achieve a pellet density of 4.07 g/cc when the powder is uniaxially pressed or calendered to 200 MPa. This demonstrates a high packing density, translating to higher energy density of the electrode laminate.

FIGS. 9A-B show SEM images: (A) a cross section of mono-grain cathode particles, in accordance with an illustrative embodiment; and (B) a cross-section of multi-grain cathode particles, in accordance with an illustrative embodiment. As shown in FIG. 9B, the multi-grain cathode particles crack along the grain boundaries after calendering. However, as shown in FIG. 9A, the mono-grain cathode particles can maintain its integrity without any cracks observed. The improved strength for the mono-grain cathode particles prevents the generation of new unprotected surfaces from cracking, which improves the cycle life of the cathode particles.

Example 5: Improved Electrochemical Performance of Mono-Grain Cathode Materials

Coin cells were made and tested from the multi-grain cathode material and mono-grain cathode material, using a Li disk anode (half-cell) to demonstrate their electrochemical performance. The active material in the cathode has the composition $Li_\alpha(Co_{0.97}Mn_{0.03})O_\delta$, where $\alpha \approx 1.000$; and $\delta \approx 2$ (as determined by high precision ICP-OES). Materials with similar Li/TM ratios were chosen as Li content in a material has a strong correlation to electrochemical performance. The coin cells were cycled galvanostatically between 3.0 V and 4.5 V at a C/5 current rate in a climate controlled chamber set at 25° C.

FIGS. 10A-D show coin half cell electrochemical performance comparisons between multi-grain and mono-grain cathode materials: (A) Cycle 1 potential vs. capacity profile; (B) Average voltage cycle life; (C) Cycle 20 potential vs. capacity profile; and (D) Energy retention, in accordance with an illustrative embodiment. For the 1$^{st}$ cycle, as shown in FIG. 10A, the mono-grain cathode material and multi-grain cathode material have different potential profiles. Both cathode materials have similar charge and discharge capacity, but the multi-grain cathode material has a lower potential at the beginning of charge and a higher potential towards the end of discharge. This is indicative of a greater impedance (i.e., inability to move Li in and out of the material) resulting in an over-potential relative to its true potential versus the Li/Li$^+$ reference for a given state of charge (i.e., capacity).

Averaging the potential profile over the entire discharge of the cell produces an average voltage value for the material. The average voltage as a function of cycling is shown in FIG. 10B. The greater the impedance of a material the lower the average voltage. Several variables can affect the impedance of a material, but due to the very similar chemistry and the same electrochemical testing conditions of the two materials, the average voltage difference can be attributed to the morphological difference between them, mono-grain versus multi-grain. For the first 8 cycles as shown in FIG. 10B, the average voltage of the mono-grain material is lower than that of the multi-grain material. This is due to a higher percentage of the surface having a protective coating. With continued cycling, the average voltages of these two cathode materials cross over and the multi-grain material begins to have the lower average voltage or greater impedance.

The potential profiles of cycle 20 for the mono-grain cathode material and the multi-grain cathode material are shown in FIG. 10C. At this point in the cell cycle life, the mono-grain cathode material shows higher potential towards the end of discharge (i.e., when all accessible Li sites in the cathode material are filled). This is opposite to that of the pristine materials due to faster degradation with cycling of the exposed unprotected surfaces of the multi-grain cathode after calendering to form pressed cathode materials. This degradation leads a higher impedance layer at the unprotected surfaces and increases average voltage fade. This, in combination with the accelerated capacity loss, leads the mono-grain cathode materials to have better energy retention as compared to the multi-grain cathode material.

As shown in FIG. 10D, the energy retention of the mono-grain cathode material after 20 cycles is 96.6%, where the energy retention of the multi-grain cathode material is only 95.4%.

In summary, the mono-grain material maintains greater amount of protected surface area through the calendering process, which results in a better long term electrochemical performance.

The improved cycling performance is associated with the morphologies of the mono-grain cathode material. The cross-sections of the pristine and cycled electrodes (50 cycles between 3.0V and 4.5V with C/5), containing the mono-grain cathode material, were observed using SEM.

FIGS. 11A-D show cross section SEM images of mono-grain cathode materials showing integrity of the particles before and after cycles. As shown, the mono-grain cathode material can maintain its structural integrity before and after cycling. The mono-grain cathode material can mitigate crack formation, thereby maintaining the protective coating, which is the main reason why the mono-grain cathode materials show better cycle life than the multi-grain cathode material.

Example 6: Improved Electrochemical Performance of Mono-Grain Cathode Materials with an $Al_2O_3$ Coating In some variations, to form an $Al_2O_3$ coating, an amount of aluminum precursor needed for the desired amount of coating (e.g. 1250 ppm) was calculated based on the weighed amount of base powder. The aluminum precursor included various aluminum salts such as nano alumina, aluminum nitrate, aluminum acetate, or other aluminum salts.

Without wishing to be limited to any method of manufacture, the disclosure describes cathode active materials (e.g. $Li_{1.00}(Co_{0.97}Mn_{0.03})O_2$; $Li_{1.00}(Co_{0.98}Mn_{0.02})O_2$, $Li_{1.00}(Co_{0.95}Mn_{0.03}Ni_{0.02})O_2$) produced by high temperature (e.g. at least 750° C. or at least 800° C.) treating an as-prepared material with an $Al_2O_3$ coating on a cathode active material. The stabilization of lithium cobalt oxides ($LiCoO_2$) can include elements that mitigate degradation mechanisms, yet allow for more lithium to be extracted and re-inserted reversibly at higher operating voltages and temperatures. Annealing at conventional temperatures of approximately 500° C. does not achieve the compositions. For high annealing temperatures, a copending U.S. Provisional Patent Application entitled "Aluminum-Doped Lithium Cobalt Manganese Oxide Batteries," by Hongli Dai et al., filed on Aug. 21, 2019, is incorporated by reference in its entirety.

Substitution or dopant elements Al can improve one or more properties, including capacity, voltage, and/or cycle life of the active electrode material. The dopants can be distributed throughout the bulk of the material (doping), segregated to the grain boundaries within the particles, distributed in the subsurface of particles (doping-coating), or deposited on the particle free surface (coating) depending on phase relations and the processing procedure and conditions. The cathode materials initially have Al substituted in during the lithiation/calcination process as described before. Then in a subsequent process the $Al_2O_3$ coating is annealed at some temperature 750-800° C. as described here.

In various aspects, an $Al_2O_3$ coating is subjected further to a high temperature (e.g. 800° C.) to partially drive the Al inward to improve energy retention and electrode resistance.

In some embodiments, fillers may be added to the cathode active material to increase packing density. Fillers may include $TiO_2$ or MgO, among others.

In some variations, the amount of $Al_2O_3$ coating may be less than or equal to 2000 ppm of the total particle. In some variations, the amount of $Al_2O_3$ coating may be less than or equal to 1500 ppm of the total particle. In some variations, the amount of $Al_2O_3$ coating may be less than or equal to 1000 ppm of the total particle. In some variations, the amount of $Al_2O_3$ coating may be less than or equal to 500 ppm of the total particle. In some variations, the amount of $Al_2O_3$ coating may be less than or equal to 250 ppm of the total particle. In various aspects, the amount of $Al_2O_3$ coating can be chosen such that a capacity of the cathode active material is not negatively impacted.

The coated cathode active material is then tested as cathode in coin cells that use a Li foil anode, a separator, and flooded electrolyte solution or in single layered full pouch cells (SLP) that use a graphite as anode, a separator and electrolyte solution.

The finished cathode powder is blended with an electrically conductive powder (carbon), organic binder, and solvent to form a pourable slurry. This slurry is cast on aluminum foil and dried, forming a laminate.

The laminate is subsequently roll-calendared to compact the particulate layer to a high specific density. During calendering, the particles flow into voids and pack together. The particles can have sufficient strength to prevent being crushed, which would create new active unprotected surfaces that will interact with the electrolyte during cell operation. The finished laminate is assembled together with a separator and anode layers and saturated with an electrolyte solution to form a Li-ion cell.

In some variations, the cathode disks can be formed from the coated powder. A further milling may be used to grind powder into finer powder. The density of the cathode disk may increase by reducing the size of the powder.

The porosity of the cathode may affect the performance of an electrochemical cell. A hydraulic press may be used to compact powder to obtain a cathode disk of desired thickness and density during cold pressing. For example, the coated cathode active material was placed in a die that can be compressed up to 5000 lbs. The press includes two plates that are hydraulically forced together to create a pressure.

The cathode disks were assembled into button cell (coin cell) batteries with a Li disk anode, a Celgard 2325 separator (25 μm thick), and the electrolyte consisting of 1.2 M LiPF6 in ethyl carbonate (EC) and ethyl methyl carbonate (EMC) (EC:EMC=3:7 w/w). Galvanostatic charge/discharge cycling was conducted in the 3.0-4.5 V range at 25° C. The test procedure includes three formation cycles at a ~C/5 rate with the 1 C capacity assumed to be 185 mAh/g, followed by aging cycles at a C/5 rate with the 1 C capacity calculated based on the third cycle discharge capacity. The batteries are aged for 20 to 300 cycles.

An electrochemical tester (e.g. Maccor 4200) provides a user with a variety of options in testing of batteries. Multiple channels can be plugged into the electrochemical tester to allow for multiple batteries to be tested simultaneously. These tests allow the user to measure parameters of the batteries, such as voltage, current, impedance, and capacity, to fully understand the effectiveness of the electrochemical cell being tested. The tester can be attached to a computer to obtain digital testing values.

Table 2 lists four samples including $LiMn_{0.02}Co_{0.98}O_2$ cathode cores with 3000 ppm Al doping. Samples 1 and 3 have unmilled cores, while Samples 2 and 4 have milled cores. The cores of Samples 2 and 4 went through CSM experiments with the following conditions, including classifier of 2200 rpm, grinding at 7500 rpm, 70 air flow, and 10% feed. Samples 2 and 4 with milled cores have a D50 of 15 to 17 μm. Samples 1 and 3 with unmilled cores have a D50 of about 23 μm, smaller than Samples 2 and 4 with the milled cores.

Samples 3 and 4 have an $Al_2O_3$ coating (also referred to a bimodal coating) including 1000 ppm Al. The coated Samples 3 and 4 were heated at a rate of 5° C./min to 800° C. for 8 hours.

TABLE 2

| Samples | Grind Condition | $Al_2O_3$ Coating Including Al (ppm) | Mono-grain/ Multi-grain Core | D50 (μm) |
| --- | --- | --- | --- | --- |
| Sample 1 | Unmilled | n/a | Multi-grain | 23 |
| Sample 2 | Milled | n/a | Mono-grain | 15 to 17 |
| Sample 3 | Unmilled | 1000 | Multi-grain | 23 |
| Sample 4 | Milled | 1000 | Mono-grain | 15 to 17 |

Figure 12A:
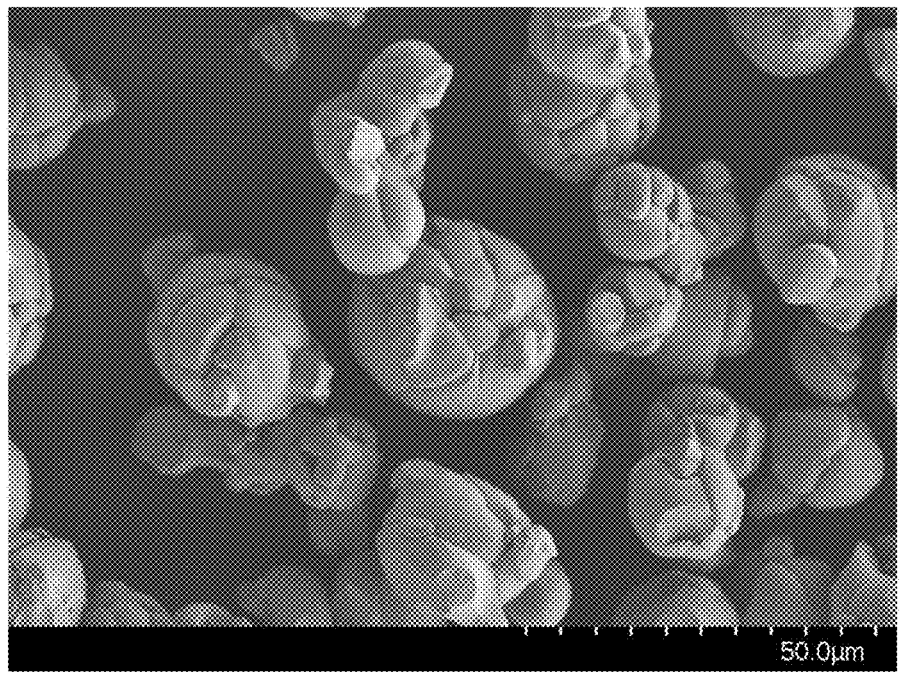
FIGS. 12A-C show the SEM images of cathode particles with different scales: (A) 50 µm, (B) 20 µm, and (C) 10 µm, respectively for Sample 1 with an uncoated core, in accordance with illustrative embodiments.
Figure 12B:
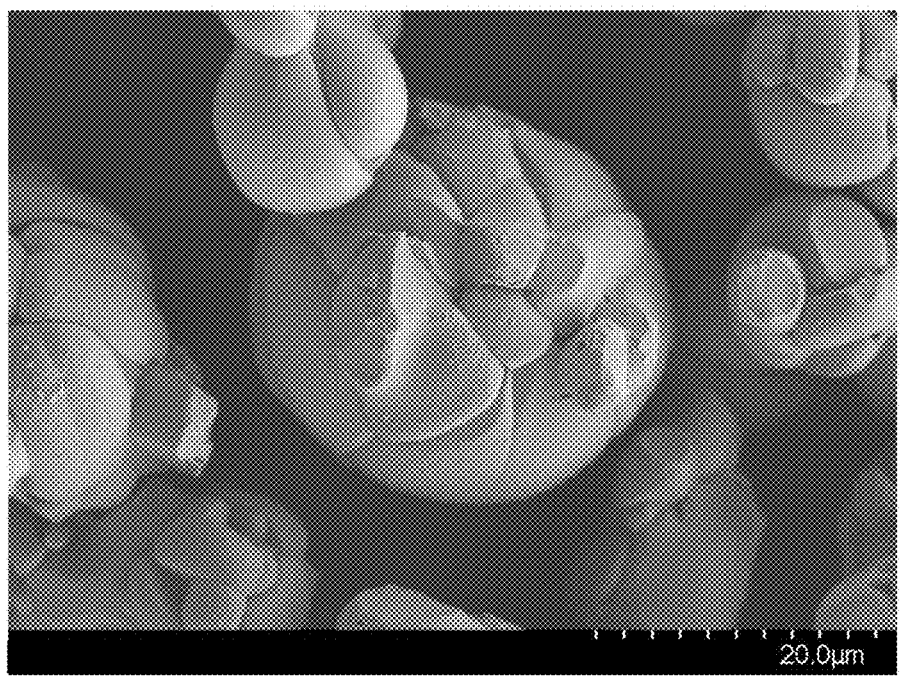
Figure 12C:
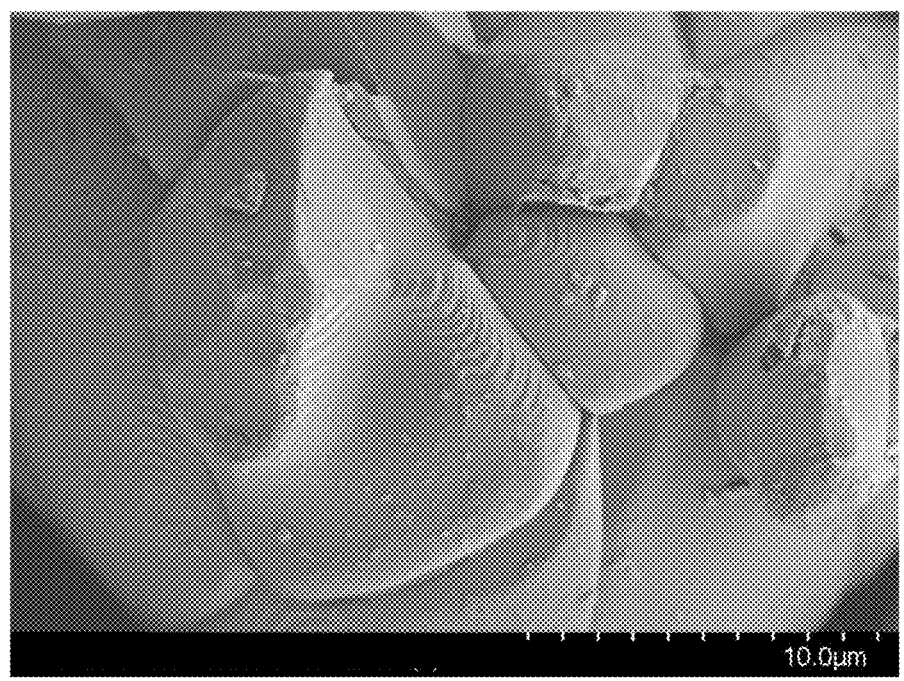
Figure 13A:
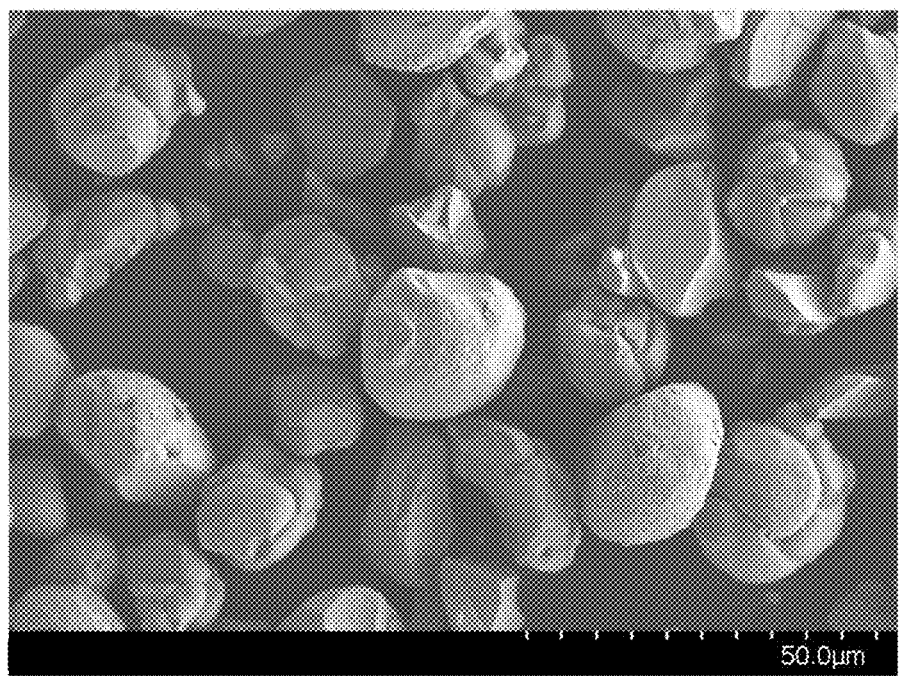
FIGS. 13A-C show the SEM images of cathode particles with different scales: (A) 50 µm, (B) 20 µm, and (C) 10 µm, respectively for Sample 2 with a milled uncoated core, in accordance with illustrative embodiments.
Figure 13B:
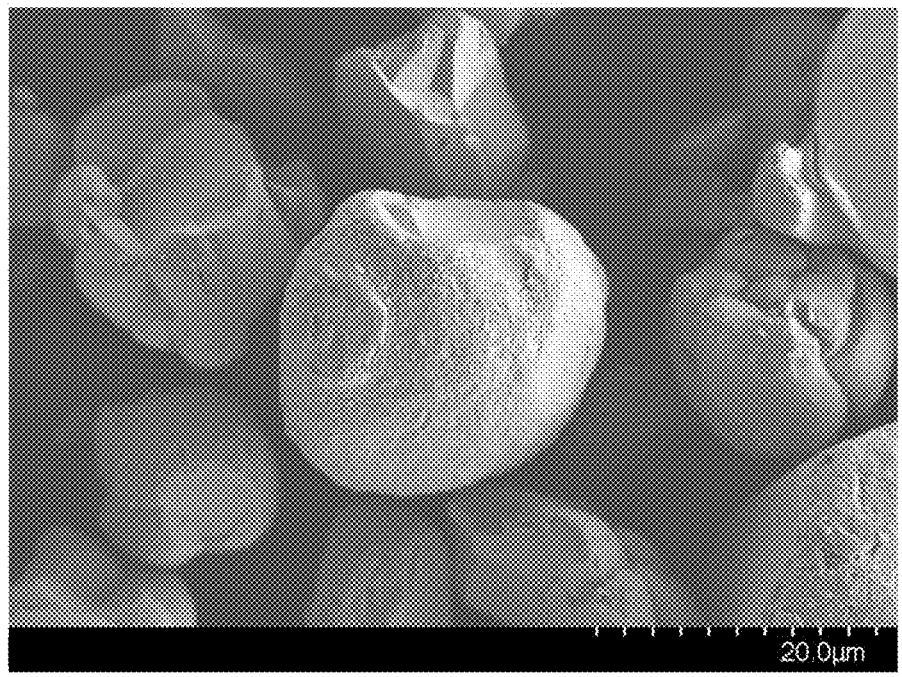
Figure 13C:
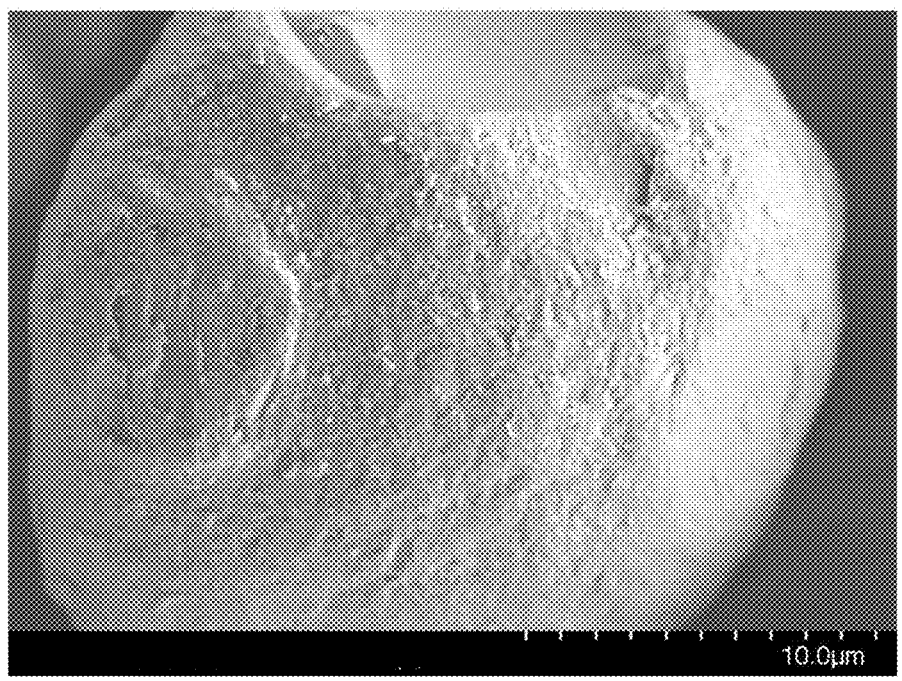
Figure 14A:
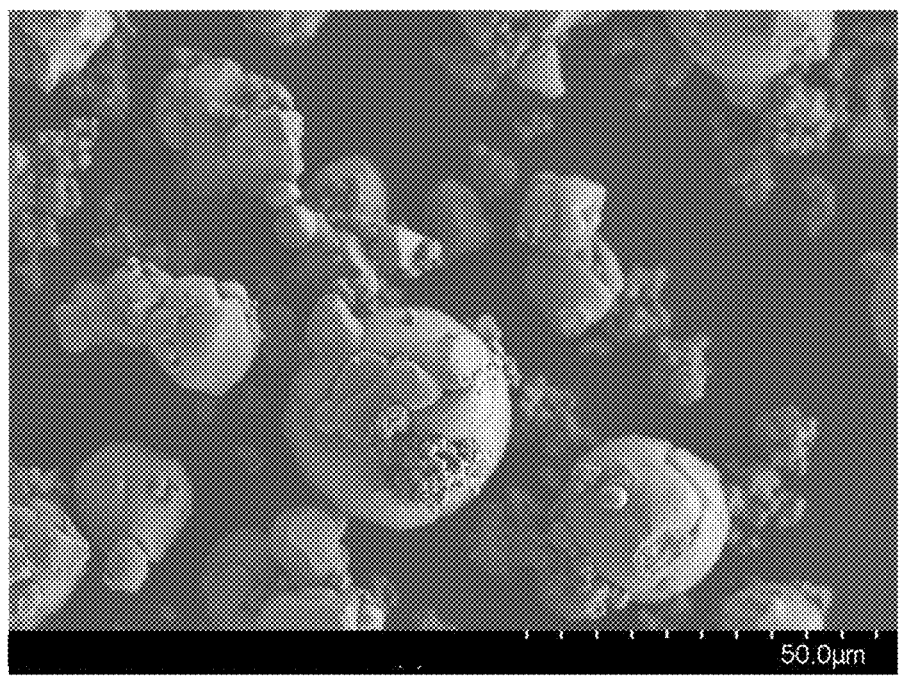
FIGS. 14A-C show the SEM images of cathode particles with different scales: (A) 50 µm, (B) 20 µm, and (C) 10 µm, respectively for Sample 3 with an unmilled coated core, in accordance with illustrative embodiments.
Figure 14B:
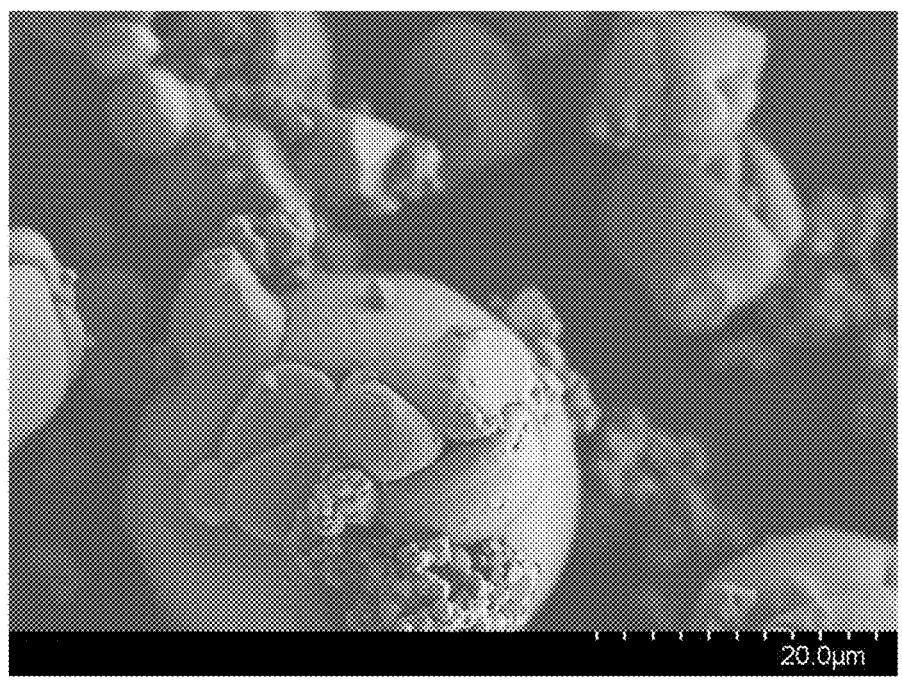
Figure 14C:
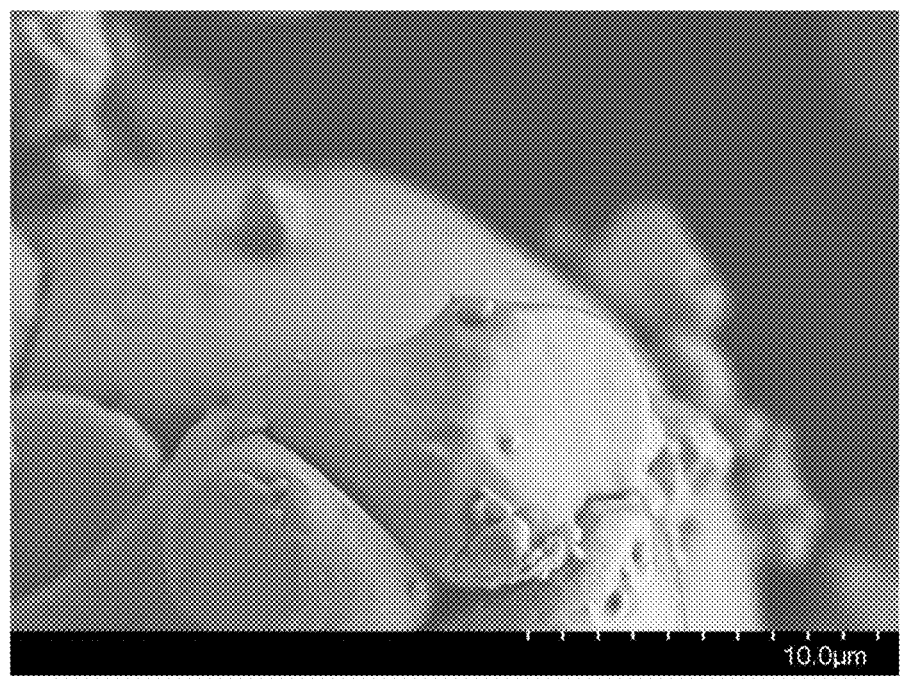
Figure 15A:
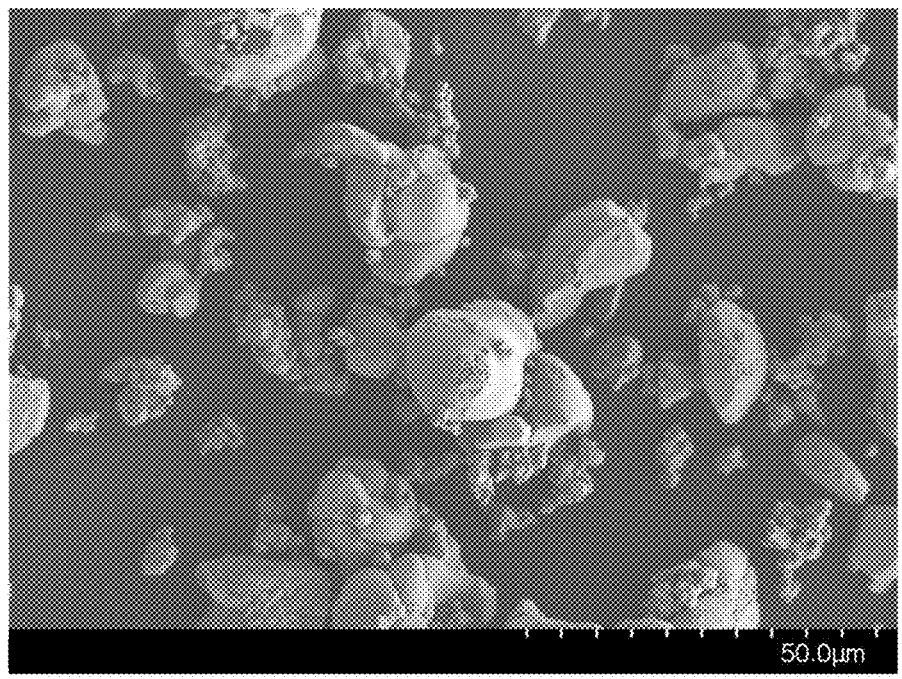
FIGS. 15A-C show the SEM images of cathode particles with different scales: (A) 50 µm, (B) 20 µm, and (C) 10 µm, respectively for Sample 4 with a milled coated core, in accordance with illustrative embodiments.
Figure 15B:
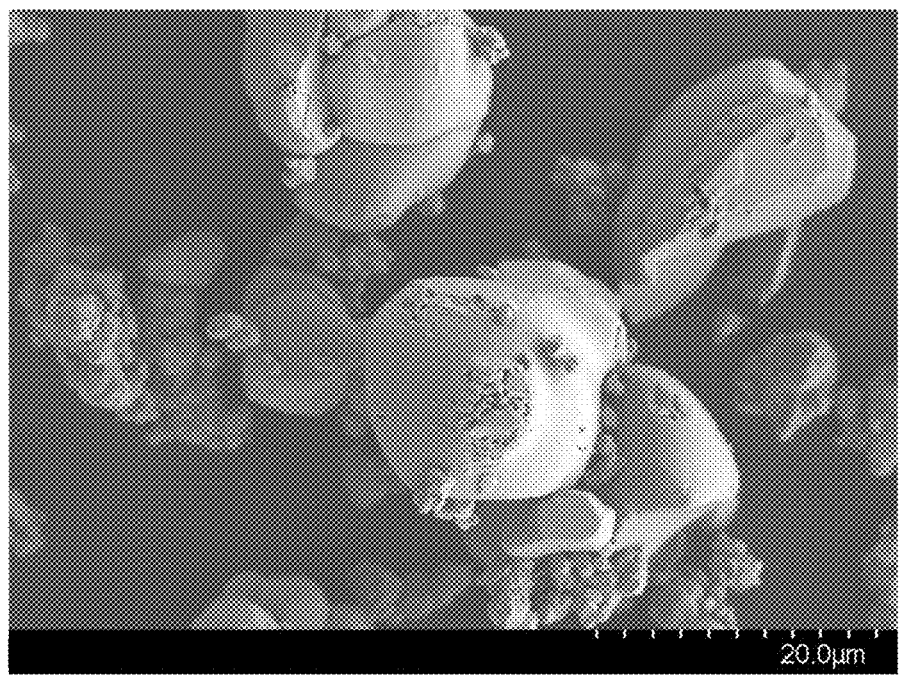
Figure 15C:
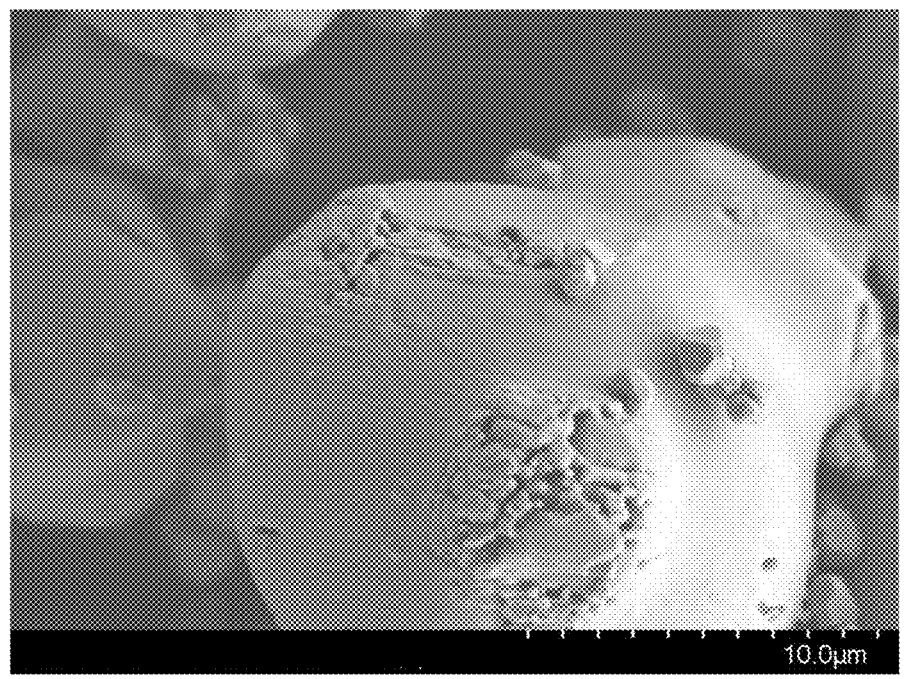

FIGS. 12A-C show the SEM images of cathode particles with different scales: (A) 50 μm, (B) 20 μm, and (C) 10 μm, respectively for Sample 1 with an uncoated core, in accordance with an illustrative embodiment. FIGS. 13A-C show the SEM images of cathode particles with different scales: (A) 50 μm, (B) 20 μm, and (C) 10 μm, respectively for Sample 2 with a milled uncoated core, in accordance with an illustrative embodiment. FIGS. 14A-C show the SEM images of cathode particles with different scales: (A) 50 μm, (B) 20 μm, and (C) 10 μm, respectively for Sample 3 with an unmilled coated core, in accordance with an illustrative embodiment. FIGS. 15A-C show the SEM images of cathode particles with different scales: (A) 50 μm, (B) 20 μm, and (C) 10 μm, respectively for Sample 4 with a milled coated core, in accordance with an illustrative embodiment.

As shown above, milled cores are smaller particles and have rough surfaces.

When comparing the SEM images of FIGS. 14A-C and FIGS. 15A-C for coated particles with uncoated particles as shown in FIGS. 12A-C and FIGS. 13A-C, the coated particles have a smoother surface than uncoated particles. For example, the milled uncoated core shown in FIGS. 13A-C is rougher than the milled coated core as shown in FIGS. 15A-C.

As shown in FIGS. 13A-C and FIGS. 15A-C, the milled particles become smaller than the unmilled particles shown in FIGS. 12A-C and FIGS. 14A-C. When particles become smaller, more surface areas can be coated with $Al_2O_3$.

Table 3 shows the physical properties of four samples listed in Table 2. The physical properties include tap density, pellet density (PD) under a calendaring pressure of 207 MPa and the specific surface area determined by BET (Brunauer, Emmett and Teller). The PD (unload) means that the PD is measured when the calendaring pressure of 207 MPa is released Pellet density is also measured after removing the pressure of 207 MPa.

TABLE 3

|  | Tap Density (g/cc) | PD 207 MPa (g/cc) | PD 207 MPa (g/cc) unload | BET ($m^2$/g) | Delta BET |
| --- | --- | --- | --- | --- | --- |
| Sample 1 | 2.89 | 3.72 | 3.60 | 0.246 | 52.8% |
| Sample 2 | 2.86 | 3.71 | 3.59 | 0.469 | 46.1% |
| Sample 3 | 2.72 | 3.96 | 3.82 | 0.246 | 44.7% |
| Sample 4 | 2.52 | 3.87 | 3.74 | 0.300 | 46.3% |

Table 4 shows the particle sizes of four samples before and after further milling, which is used to mill the powder to be finer powder. As shown in Table 4, Sample 1 (uncoated) shows that further milling reduces the D50 from 24.31 μm to 20.91 μm with a delta D50 of 14.0%. Sample 2 (milled uncoated) shows that further milling reduces the D50 from 17.09 μm to 16.14 μm with a delta D50 of 5.6%. Sample 3 (unmilled coated) shows that further milling reduces the D50 from 22.26 μm to 19.07 μm with a delta D50 of 14.3%. Sample 4 (coated and milled) shows that further milling reduces the D50 from 16.39 μm to 15.26 μm with a delta D50 of 6.9%.

As shown in Table 4, when D50 is less than 20 μm, the delta D50 is reduced significantly from about 14.0% for Samples 1 and 3 (unmilled core) to about 6-7% for Samples 2 and 4 (milled core). The result suggests that the reduction in D50 due to the further milling for the milled cores is significantly less than that for the unmilled cores.

Also, as shown in Table 4, milled Samples 3 and 4 before further milling have a smaller D10 of about 6.29 to 6.86 μm compared to a D10 of about 9.63 μm to 14.13 μm for unmilled Samples 1 and 2. The milled Samples 3 and 4 after further milling have a smaller D10 of about 4.32 to 4.54 μm compared to a D10 of about 8.04 μm to 9.64 μm for unmilled Samples 1 and 2.

TABLE 4

|  | Particle Size Distribution (PSD) | | | | PSD 207 MPa | | | | | |
| --- | --- | --- | --- | --- | --- | --- | --- | --- | --- | --- |
|  | D10 (μm) | D50 (μm) | D90 (μm) | D99 (μm) | D10 (μm) | D50 (μm) | D90 (μm) | D99 (μm) | Delta D10 (%) | Delta D50 |
| Sample 1 | 14.13 | 24.31 | 35.59 | 43.22 | 9.64 | 20.91 | 33.32 | 41.46 | 31.8 | 14.0 |
| Sample 2 | 9.63 | 17.09 | 23.34 | 27.62 | 8.04 | 16.14 | 26.22 | 30.53 | 16.5 | 5.6 |
| Sample 3 | 6.86 | 22.26 | 34.70 | 44.33 | 4.54 | 19.07 | 32.72 | 41.51 | 14.3 | 14.3 |
| Sample 4 | 6.29 | 16.39 | 24.41 | 30.52 | 4.32 | 15.26 | 24.11 | 32.29 | 6.9 | 6.9 |

Figure 16:
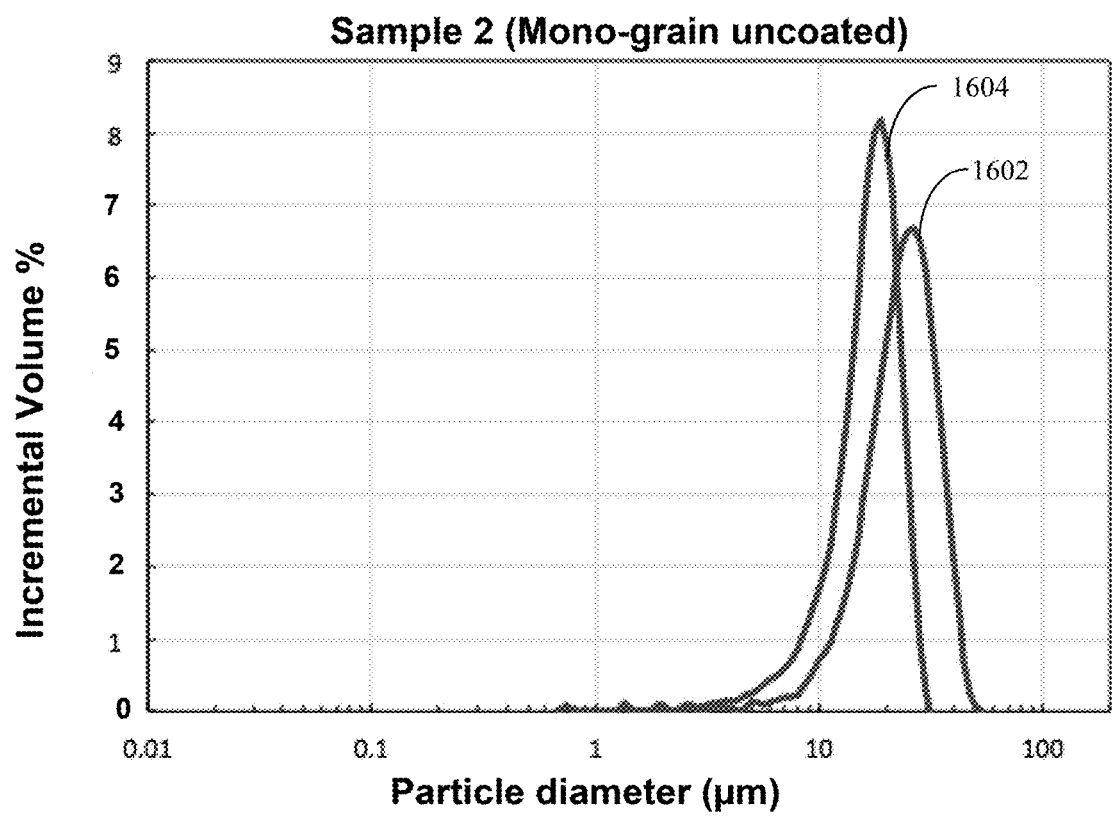
FIG. 16 shows the particle size distribution of the milled uncoated sample (Sample 2), in accordance with an illustrative embodiment.

FIG. 16 shows the particle size distribution of the milled uncoated sample (Sample 2), in accordance with an illustrative embodiment. As shown, further milling for Sample 2 (milled uncoated) causes the D50 to shift from 17.09 μm to 16.14 μm with a delta D50 of 5.6%.

Figure 17:
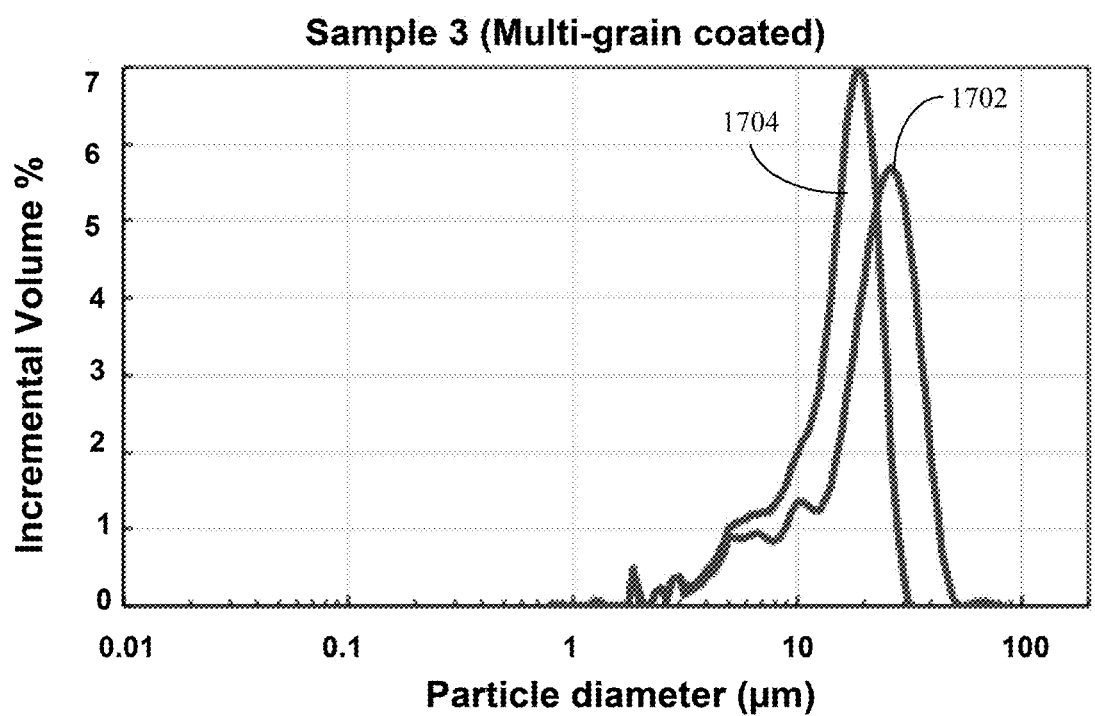
FIG. 17 shows the particle size distribution of the unmilled coated sample (Sample 3), in accordance with an illustrative embodiment.

FIG. 17 shows the particle size distribution of the unmilled coated sample (Sample 3), in accordance with an illustrative embodiment. As shown, further milling for Sample 3 (unmilled coated) causes the D50 to shift from 22.26 μm to 19.07 μm with a delta D50 of 14.3%.

Figure 18:
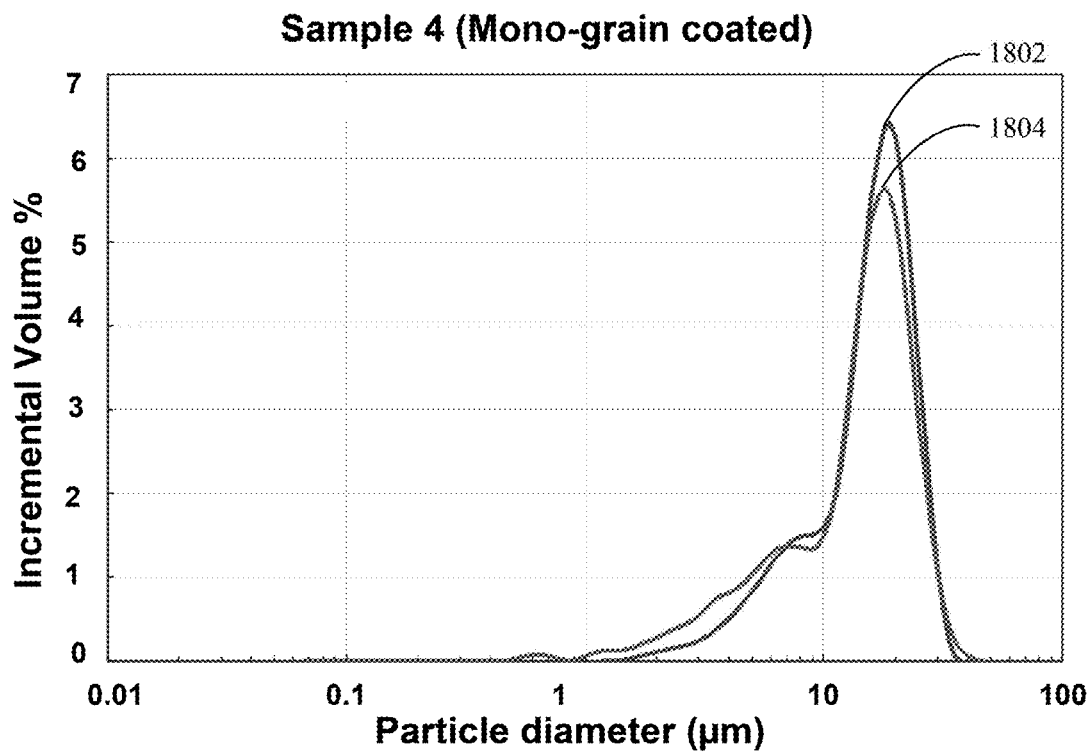
FIG. 18 shows the particle size distribution for the milled coated sample (Sample 4), in accordance with an illustrative embodiment.

FIG. 18 shows the particle size distribution for the milled coated sample (Sample 4), in accordance with an illustrative embodiment. As shown, further milling for Sample 4 (milled coated) causes the D50 to reduce from 16.39 μm to 15.26 μm with the lowest D50 of 15.26 μm among all Samples 1-4.

The elemental compositions of all four samples were analyzed by using inductively coupled plasma mass spectrometry (ICP-MS). The ICP-MS results are listed in Table 5. Li and Mn come from the cathode material $Li_{1.00}(Co_{0.98}Mn_{0.02})O_2$, doped with Al and with alumina coating. As shown, the compositions Li:Me, Mn:Me remain about the same for Samples 1-4, which reveal no change in chemistry. As shown in Table 5, Al in Samples 3 and 4 are about 1000 ppm higher than Samples 1 and 2. The additional Al of about 1000 ppm in Samples 3 and 4 may come from the $Al_2O_3$ coating.

TABLE 5

ICP Results of Four Samples

| | Li:Me | Mn:Me | Al(ppm) |
|---|---|---|---|
| Sample 1 | 0.9947 | 0.02 | 2850 |
| Sample 2 | 0.9953 | 0.02 | 2800 |
| Sample 3 | 1.0014 | 0.017 | 3840 |
| Sample 4 | 1.0014 | 0.017 | 3690 |

The cathode material has a hexagonal structure. X-ray diffraction (XRD) was also used to determine the crystal structure R-3m and lattice dimensions a and c in the hexagonal structure. The XRD results are listed in Table 6. As shown in Table 6, no changes were observed in the dimensions.

TABLE 6

XRD Results of Four Samples

| | a (Anstrom) | c (Anstrom) | Impurity(wt %) |
|---|---|---|---|
| Sample 1 | 2.815 | 14.073 | 1.6 |
| Sample 2 | 2.815 | 14.072 | 0.2 |
| Sample 3 | 2.815 | 14.076 | 0.4 |
| Sample 4 | 2.815 | 14.075 | n/a |

The performance of a single layer pouch full cell was evaluated at 25° C. and 45° C. The cells included the cathode material $Li_{1.00}(Co_{0.97}Mn_{0.03})O_2$. The cells were tested for up to about 300 cycles.

Figure 19:
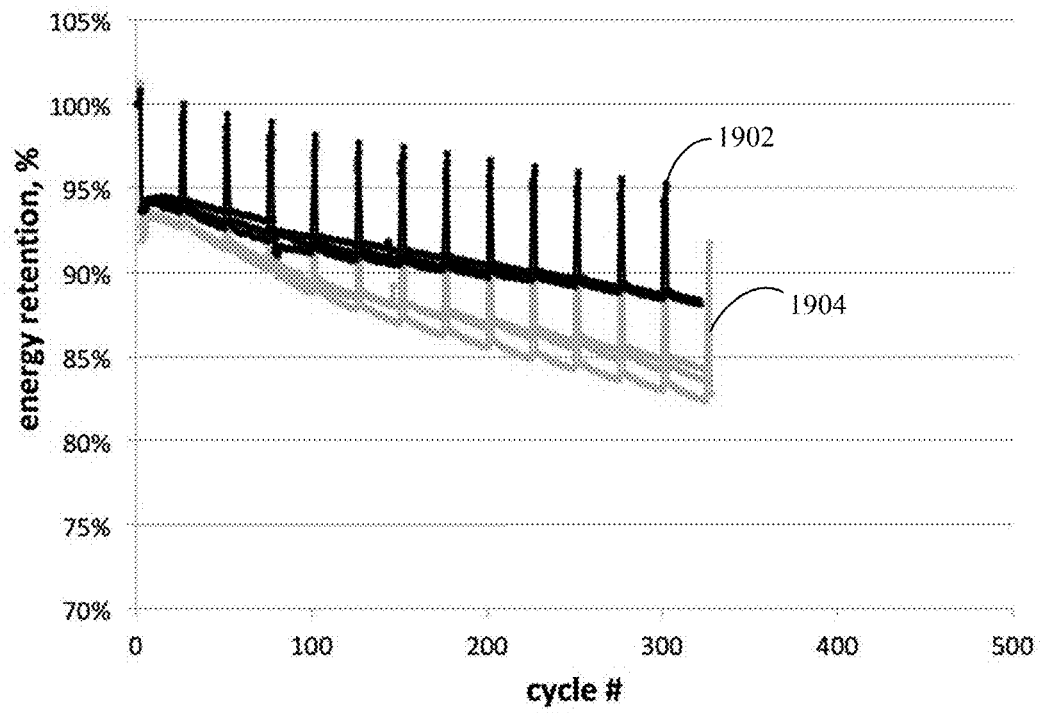
FIG. 19 shows energy retention curves for a milled core and an unmilled core cathode at 25° C., in accordance with an illustrative embodiment.

FIG. 19 shows energy retention curves for a milled core cathode and an unmilled core cathode at 25° C., in accordance with an illustrative embodiment. As shown in FIG. 19, curve 1902 represents energy retention for the milled core cathode with $Al_2O_3$ coating including 1000 ppm Al (annealed at 800° C. for 8 hours), while curve 1904 represents the energy retention for the unmilled core cathode with $Al_2O_3$ coating including 1250 ppm Al (annealed at 800° C. for 8 hours). The data show the energy retention for milled core cathode has improved cycle life over the unmilled core cathode.

Figure 20:
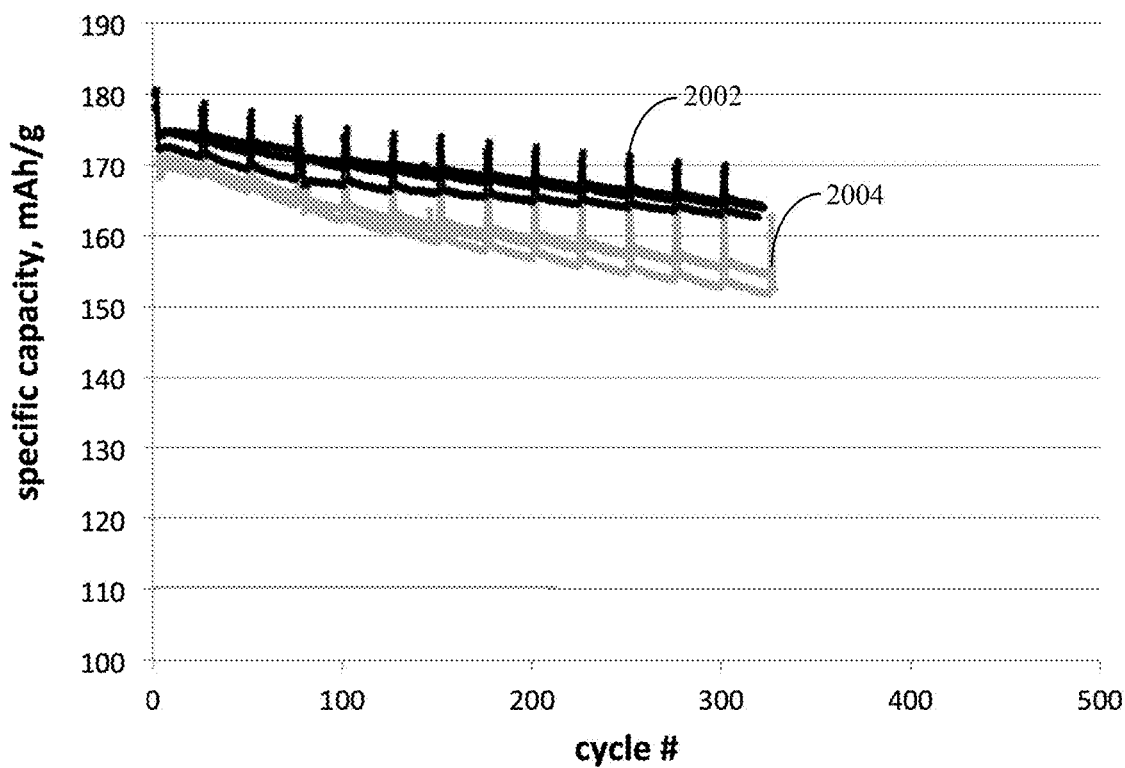
FIG. 20 shows specific energy curves for the milled core cathode and unmilled core cathode at 25° C., in accordance with an illustrative embodiment.

FIG. 20 shows specific energy curves for the milled core cathode and unmilled core cathode at 25° C., in accordance with an illustrative embodiment. As shown in FIG. 20, curve 2002 represents the specific energy for the milled core cathode, while curve 2004 represents the specific energy for the unmilled core cathode. The milled core cathode and the unmilled core cathode have the same $Al_2O_3$ coating as the milled core cathode and the unmilled core cathode of FIG. 19. The data show that the specific capacity for the milled core cathode has improved cycle life over the unmilled core cathode.

Figure 21:
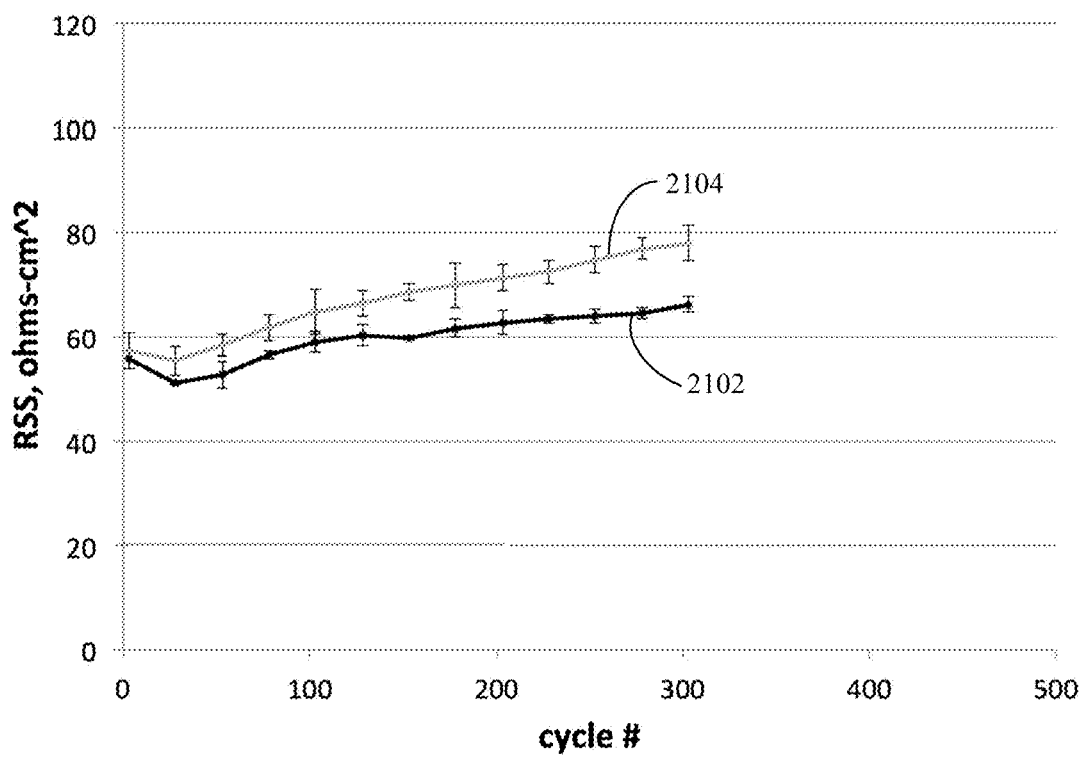
FIG. 21 shows RSS curves for the milled core cathode and unmilled core cathode at 25° C., in accordance with an illustrative embodiment.

FIG. 21 shows RSS curves for the milled core cathode and unmilled core cathode at 25° C., in accordance with an illustrative embodiment. As shown in FIG. 21, curve 2002 represents the RSS for the milled core cathode, while curve 2004 represents the RSS for the unmilled core cathode. The milled core cathode and the unmilled core cathode have the same $Al_2O_3$ coating as the milled core cathode and the unmilled core cathode of FIG. 19. The data show that initial RSS is lower with the milled core cathode and also the growth of RSS versus cycles is lower for the milled core cathode than the unmilled core cathode.

Figure 22:
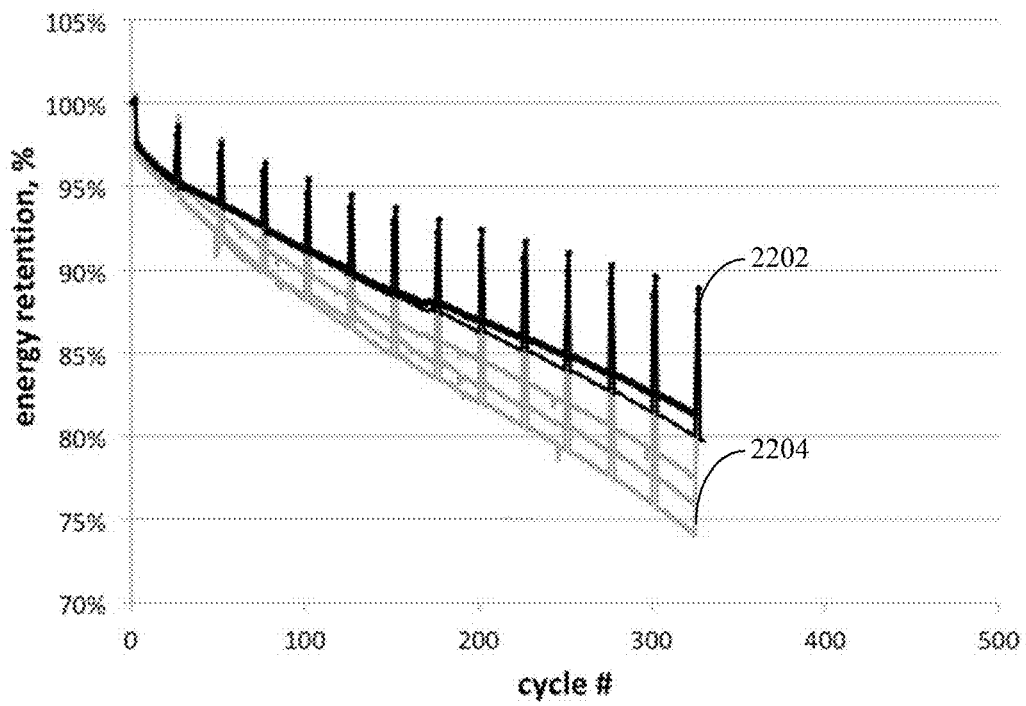
FIG. 22 shows energy retention curves for the milled core and the unmilled core cathode at 45° C., in accordance with an illustrative embodiment.

FIG. 22 shows energy retention curves for the milled core cathode and the unmilled core cathode at 45° C., in accordance with an illustrative embodiment. As shown in FIG. 22, curve 2202 represents energy retention for the milled core cathode, while curve 2204 represents the energy retention for the unmilled core cathode. The milled core cathode and the unmilled core cathode have the same $Al_2O_3$ coating as the milled core cathode and the unmilled core cathode of FIG. 19.

Figure 23:
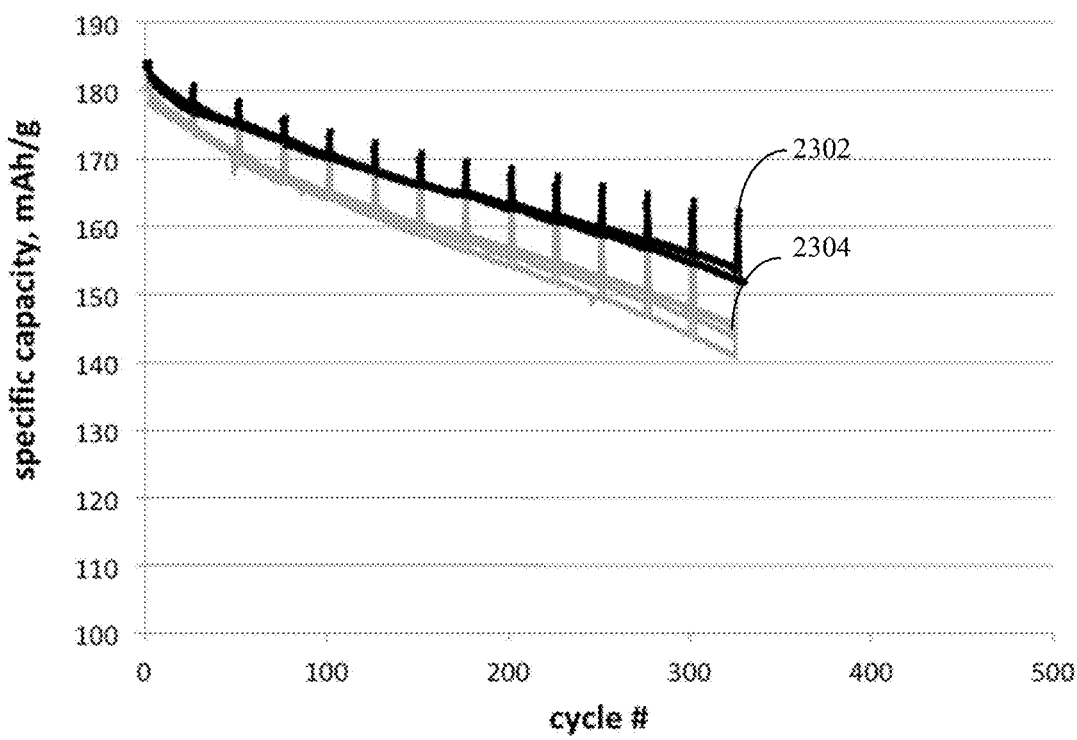
FIG. 23 shows specific energy curves for the milled core cathode and unmilled core cathode at 45° C., in accordance with an illustrative embodiment.

FIG. 23 shows specific energy curves for the milled core cathode and unmilled core cathode at 45° C., in accordance with an illustrative embodiment. As shown in FIG. 23, curve 2302 represents the specific energy for the milled core cathode, while curve 2304 represents the specific energy for the unmilled core cathode. The milled core cathode and the unmilled core cathode have the same $Al_2O_3$ coating as the milled core cathode and the unmilled core cathode of FIG. 19.

Figure 24:
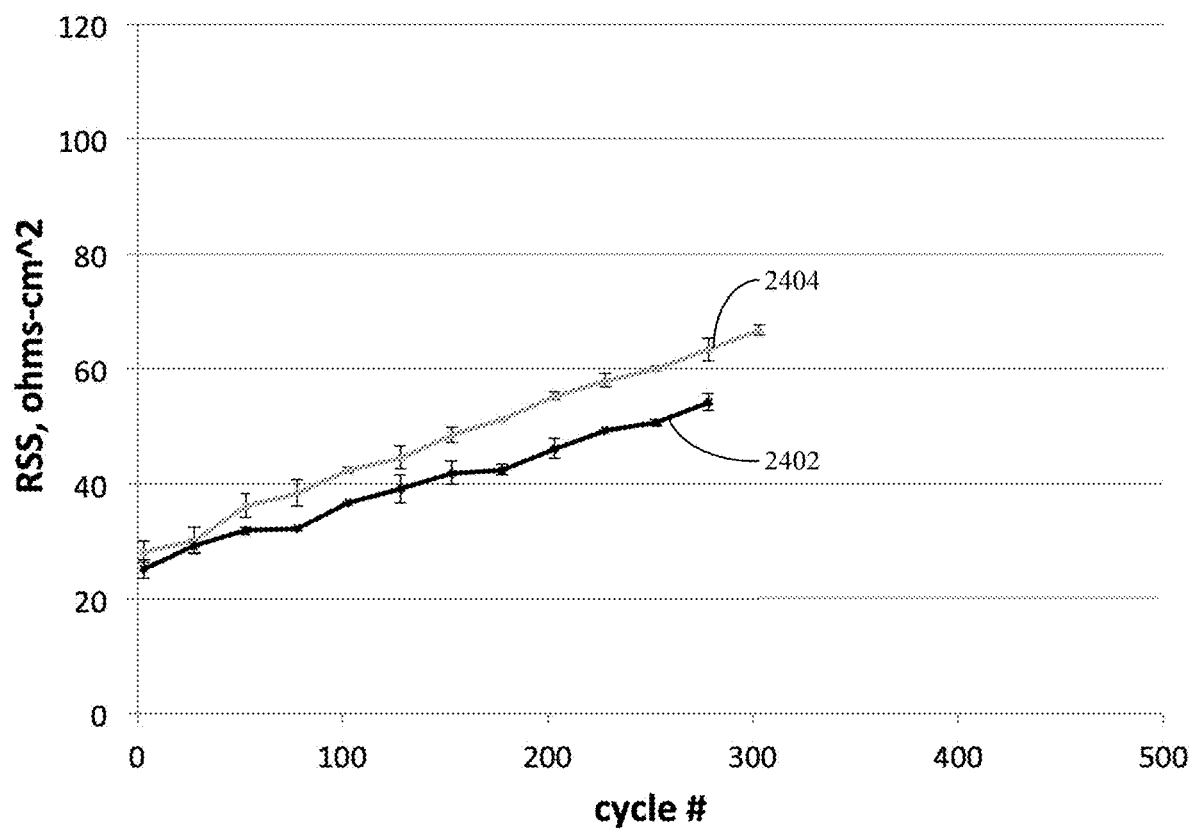
FIG. 24 shows RSS curves for the milled core cathode and the unmilled core cathode at 45° C., in accordance with an illustrative embodiment.

FIG. 24 shows RSS curves for the milled core cathode and unmilled core cathode at 45° C., in accordance with an illustrative embodiment. As shown in FIG. 24, curve 2402 represents the RSS for the milled core cathode, while curve 2404 represents the RSS for the unmilled core cathode. The milled core cathode and the unmilled core cathode have the same $Al_2O_3$ coating as the milled core cathode and the unmilled core cathode of FIG. 19.

As shown in FIGS. 22-24, the trends at 45° C. are similar to that at 25° C. The energy retention, specific energy, and RSS are all better for the milled core cathode than the unmilled core cathode.

Table 7 lists the specific capacity and RSS. In Table 7, n represents the number of cycles. The specific capacity is 181.6 mAh/g after 3 cycles at 45° C. and is 178 mAh/g after 3 cycles at 25° C. for the unmilled sample coated with $Al_2O_3$ including 1250 ppm Al. The unmilled coated sample was annealed at 800° C. for 8 hours. Also, the specific capacity is 182.8 mAh/g after 3 cycles at 45° C. and is 179.4 mAh/g after 3 cycles at 25° C. for the milled sample with small core and coated with $Al_2O_3$ including 1000 ppm Al. The milled coated sample was annealed at 800° C. for 8 hours. The milled samples show higher specific capacity than that of the unmilled samples at both 25° C. and 45° C.

TABLE 7

|  | Unmilled Sample at 45° C. n = 3 | Milled Sample at 45° C. n = 3 | Unmilled Sample at 25° C. n = 3 | Milled Sample at 25° C. n = 3 |
|---|---|---|---|---|
| Specific Capacity (mAh/g) | 181.6 | 182.8 | 178.0 | 179.4 |
| RSS (ohms-cm$^2$) | 28 | 26 | 55 | 51 |

As shown in Table 7, the RSS is 28 ohms-cm$^2$ after 3 cycles at 45° C. and 55 ohms-cm$^2$ after 3 cycles at 25° C. for the unmilled samples. The RSS is 26 ohms-cm$^2$ after 3 cycles at 45° C. and 51 ohms-cm$^2$ after 3 cycles at 25° C. for the milled samples. The RSS of the milled samples are lower than that of the unmilled samples at the corresponding temperatures.

Example 7: Compositions Containing Mn and Ni Substitution

A composition with Mn and Ni substitution in LiCoO$_2$ was also produced by utilizing high tap density of metal hydroxide precursors, high calcination temperature, and long calcination time to control the production of mono-grain cathode materials.

The CSTR was set up to produce a precursor powder used for the synthesis of Li$_\alpha$(Co$_{0.95}$Mn$_{0.03}$Ni$_{0.02}$)O$_\delta$, where $0.95<\alpha<1.05$ and 2. In general, a metal salt feed solution was prepared by mixing the desired proportions of CoSO$_4$*7H$_2$O, MnSO$_4$*H$_2$O, and NiSO$_4$*6H$_2$O into deionized water to make a solution of 2.0 molar (M). Ammonium hydroxide (NH$_4$OH, 5 M) is used as a chelating agent. A 5 L CSTR was filled with distilled water to a 3.25 L working volume, and heated to 50° C. The co-precipitate slurry was stirred in the reactor at a rate of 1100 rpm, and was purged with nitrogen to produce hydroxide particles. By controlling the feed rate of the metal sulfate solution (0.085 L/h), the feed rate of chelating agent (0.09 L/h), the pH (11.8), the precursor powder with high densities, and suitable particle size distributions can be obtained. The resulting precursor powder was washed in distilled water to remove the salt residue and dried for storage.

Figure 25:
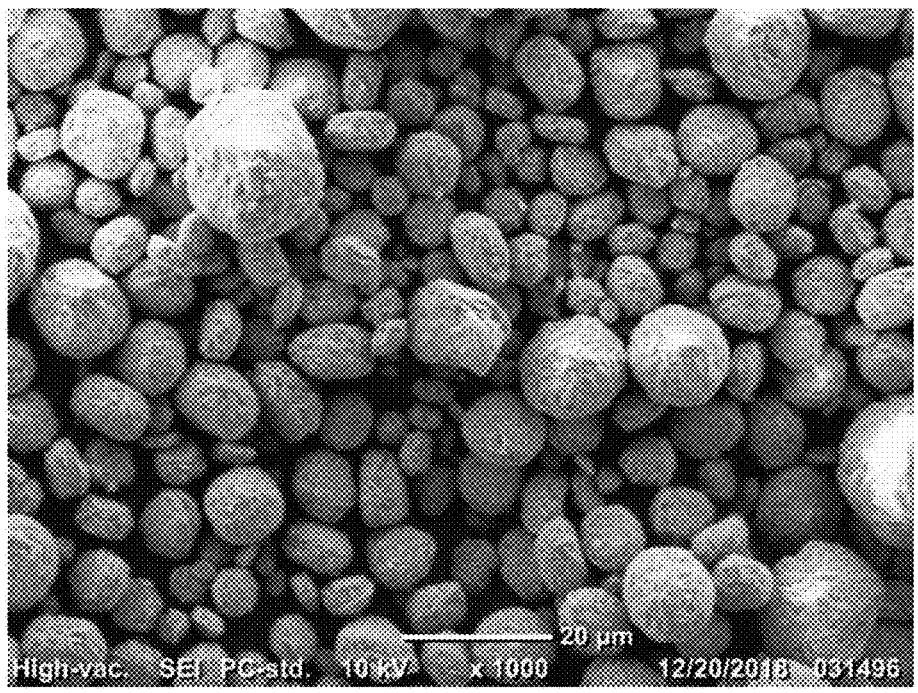
FIG. 25 shows a SEM image of the mixture of precursor particles, in accordance with an illustrative embodiment.

Table 8 lists the coprecipitation conditions using a NH$_4$OH chelating agent. Under these conditions, the precursor particles grow with time to high density particles. A mixture of precursor particles from different time segments of the batch could obtain a tap density of 2.19 g/cc w and a particle size distribution as shown in Table 8, where D50=10.9 μm. FIG. 25 shows a SEM image of the mixture of precursor particles made from the process with the conditions listed in Table 8.

TABLE 8

| Parameters | P326.M3N2 |
|---|---|
| Target compostion | Co$_{0.95}$Mn$_{0.03}$Ni$_{0.02}$ |
| Reactor working volume, L | 3.25 |
| Gas and flow rate, L/min | N2/4 |
| Chelating agent | NH$_4$OH |
| Stir rate, rpm | 1100 |
| Temperature, ° C. | 50.5 |
| pH | 11.8 |
| Residence time, h | 12.5 |
| Metal sulfate conc., M | 2 |
| Chelate conc, M | 5 |
| NaOH conc, M | 4 |
| Metal sulfate flow rate, L/h | 0.085 |
| Chelate flow rate, L/h | 0.090 |
| NaOH flow rate, L/h | 0.085 |
| Chelate/Metal ratio | 2.85 |
| Tap Density, g/cc | 2.19 |
| D10, μm | 5.2 |
| D50, μm | 13.4 |
| D90, μm | 33.5 |
| D99, μm | 51.0 |

This mixture was blended with lithium carbonate (Li$_2$CO$_3$) using 1.02 as a ratio of Li/TM and calcined at a temperature 1070° C. with a hold-times of 15 hours. The resulting precursor powder was ground to break up agglomerate particles.

Figure 26:
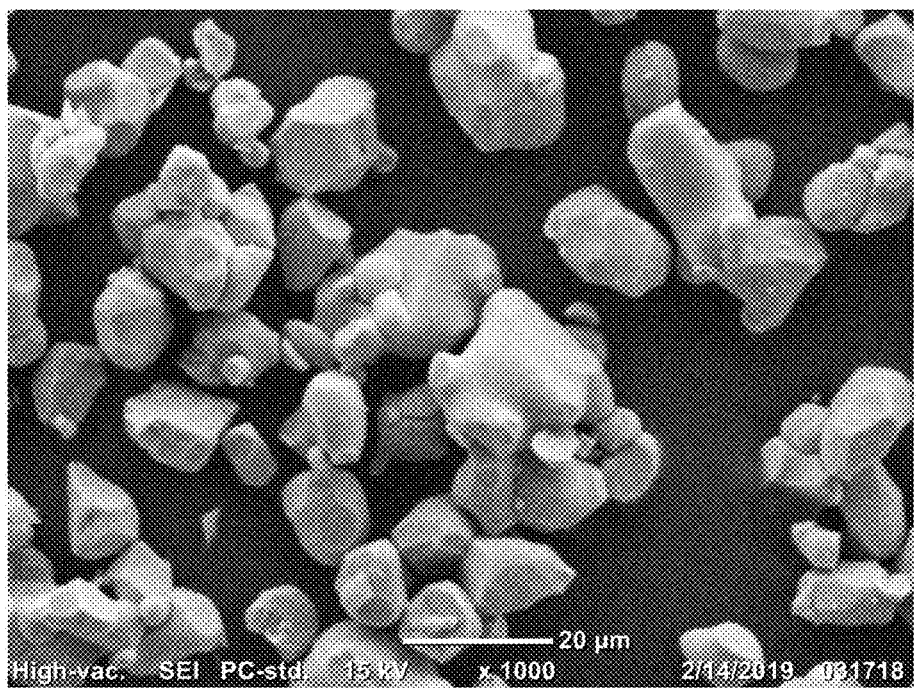
FIG. 26 shows a SEM image of the particles after grinding, in accordance with an illustrative embodiment.

FIG. 26 shows a SEM image of the particles after grinding.

Figure 27:
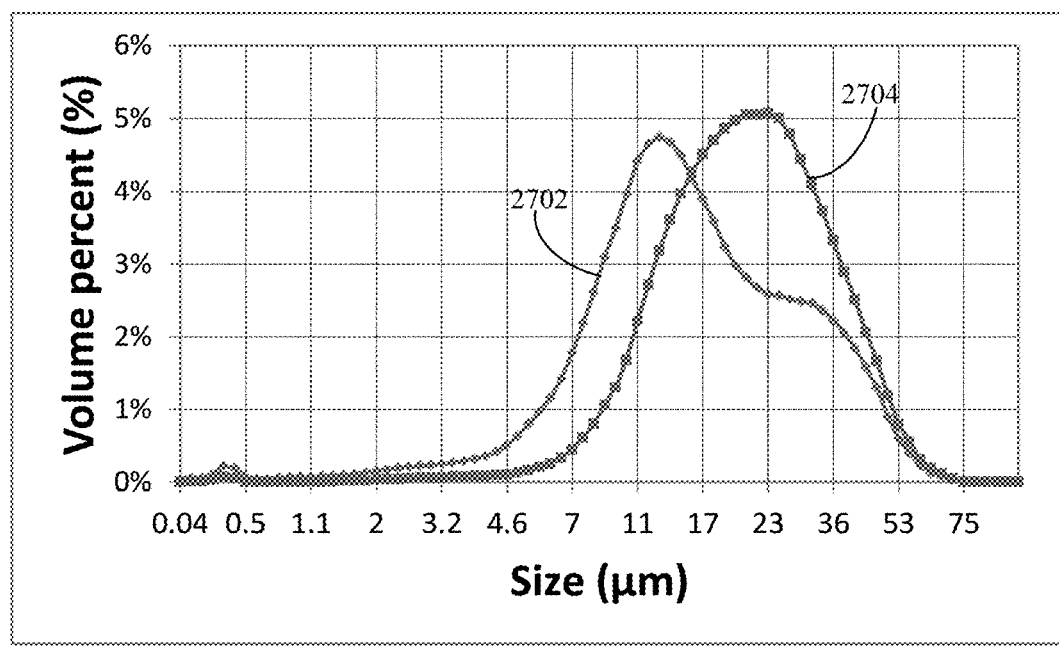
FIG. 27 shows a comparison of the particle size distribution of the precursor particles and the lithiated/calcined particles, in accordance with an illustrative embodiment.

A comparison of the particle size distribution of the precursor particles 2702 and the lithiated/calcined particles 2704 is shown in FIG. 27. The bimodal shape for the precursor particles 2702 is converted into a single mode distribution with a D10=10.0 μm, D50=20.3 μm, D90=37.1 μm, and a D99=53.4 μm for the lithiated/calcined particles 2704.

In this Example 7, the coating was applied in a different way from the Example 6. Specifically, the coating was initially applied using a process with a stearic acid as a dry dispersant. After an alumina (Al$_2$O$_3$) coating was applied to the precursor particles, the mixture was annealed at 900° C. for 8 hours. The high temperature annealing was disclosed in the copending patent application, entitled "Aluminum-Doped Lithium Cobalt Manganese Oxide Batteries," by Hongli Dai et al., filed on Aug. 21, 2019, which is incorporated herein by reference in its entirety.

Coin cells were made and tested from the multi-grain cathode material and mono-grain cathode material, using a Li disk anode (half-cell) to demonstrate their electrochemical performance. The active material in the cathode has the composition Li$_\alpha$(Co$_{0.95}$Mn$_{0.03}$Ni$_{0.02}$)O$_\delta$, where a is as labeled in the diagram; and δ≈2 (as determined by high precision ICP-OES). Three coin cells of each composition were cycled galvanostatically between 3.0 V and 4.5, 4.51, 4.52, 4.53, 4.54, and 4.55 V for two cycles each at a C/5 current rate, and then from cycle 13 to 40 from 3.0 V to 4.6 V at a C/5 current rate. Cycling was performed in a climate controlled chamber which was set at 25° C.

FIGS. 28 A-D show electrochemical performance comparisons between multi-grain and mono-grain cathode materials: (A) Cycle 13 potential vs. capacity profile; (B) Average voltage cycle life; (C) Cycle 25 potential vs. capacity profile; and (D) Energy retention, in accordance with illustrative embodiments.

Figure 28A:
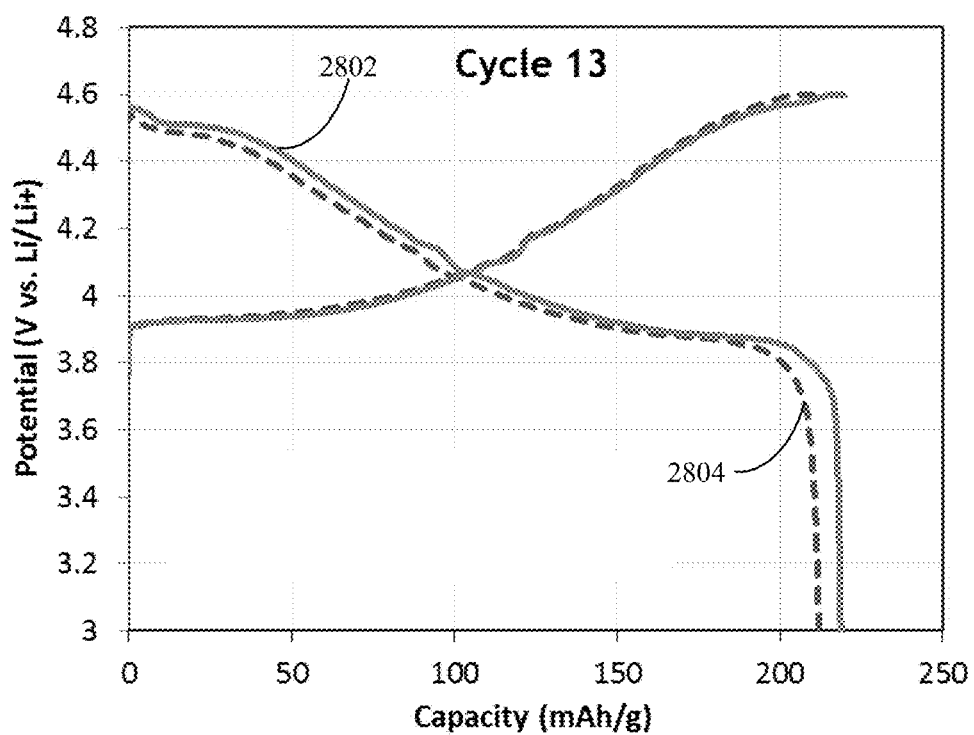
FIGS. 28 A-D show electrochemical performance comparisons between multi-grain and mono-grain cathode materials: (A) Cycle 13 potential vs. capacity profile; (B) Average voltage cycle life; (C) Cycle 25 potential vs. capacity profile; and (D) Energy retention, in accordance with illustrative embodiments.

The potential vs. specific capacity of the 13$^{th}$ cycle, as shown in FIG. 28A, is chosen for comparison at the beginning of a 4.6V UCV cycle series. At this point, after the voltage steps in cycles 1-12 the multigrain cathode material 2804 has a slightly less cell voltage and reduced capacity. It is generally expected that a lower Li/TM ratio has a slightly lower capacity and voltage but better cycle retention.

Figure 28B:
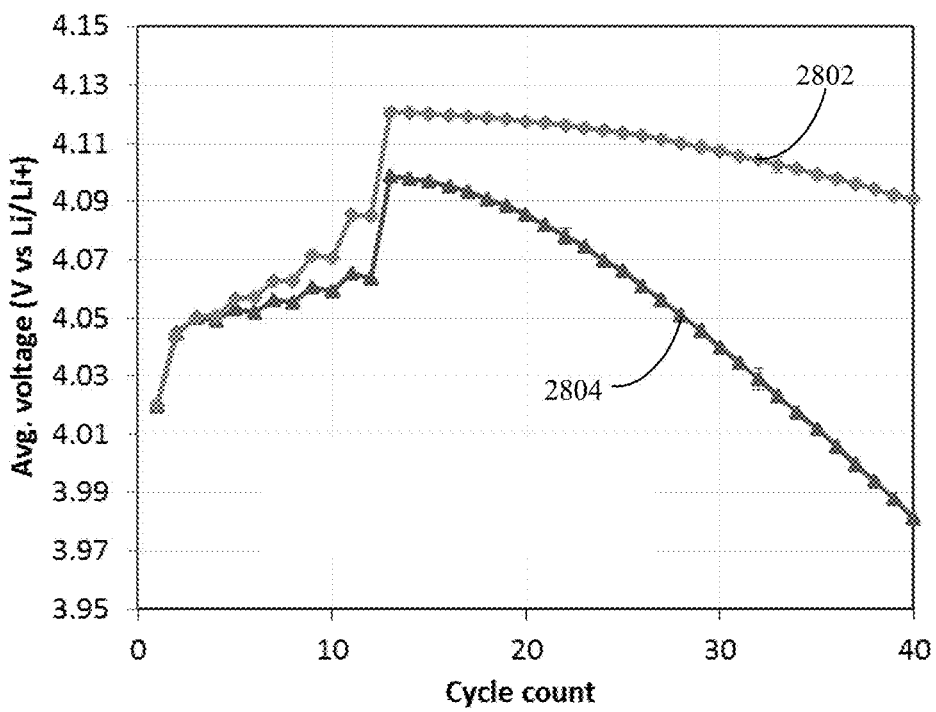

Averaging the potential profile over the entire discharge of the cell produces an average voltage value for the cathode material. The average voltage as a function of cycling is shown in FIG. 28B. The greater the impedance of a cathode material the lower the average voltage. Several variables can affect the impedance of the cathode material, but due to the very similar chemistry and the same electrochemical testing conditions of the two cathode materials, the average voltage difference can be attributed to the morphological difference between the mono-grain cathode material 2802 and the multi-grain cathode material 2804.

For the first 4 cycles as shown in FIG. 28B, the average voltage of the mono-grain cathode material 2802 is similar to the multi-grain cathode material 2804. With the continued cycling, the average voltage curves of the two cathode materials separate, i.e. the multi-grain cathode material 2804 decreases to lower average voltages or greater impedance, while the mono-grain cathode material 2802 demonstrates greater voltage stability than the multi-grain cathode material 2804.

Figure 28C:
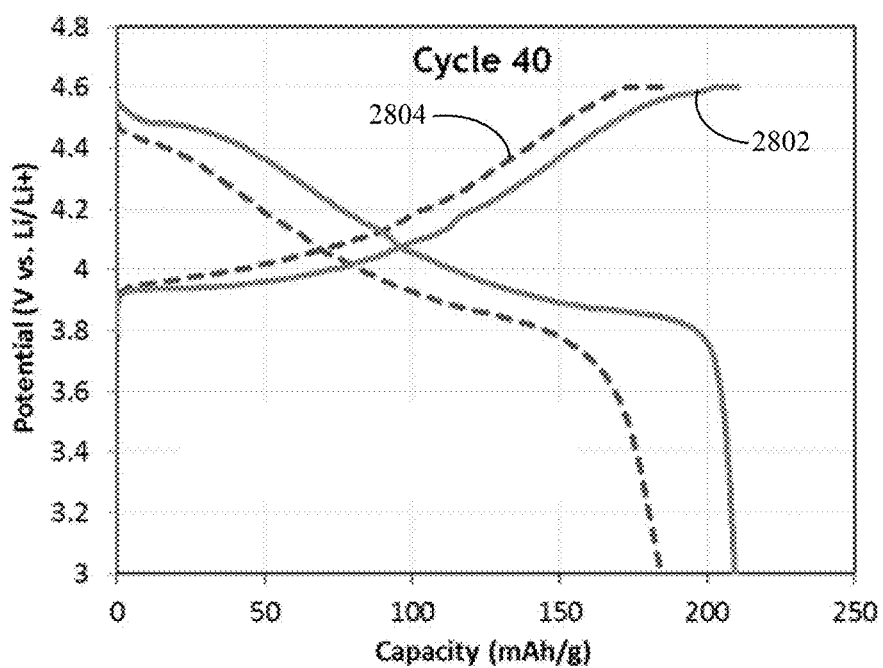
Figure 28D:
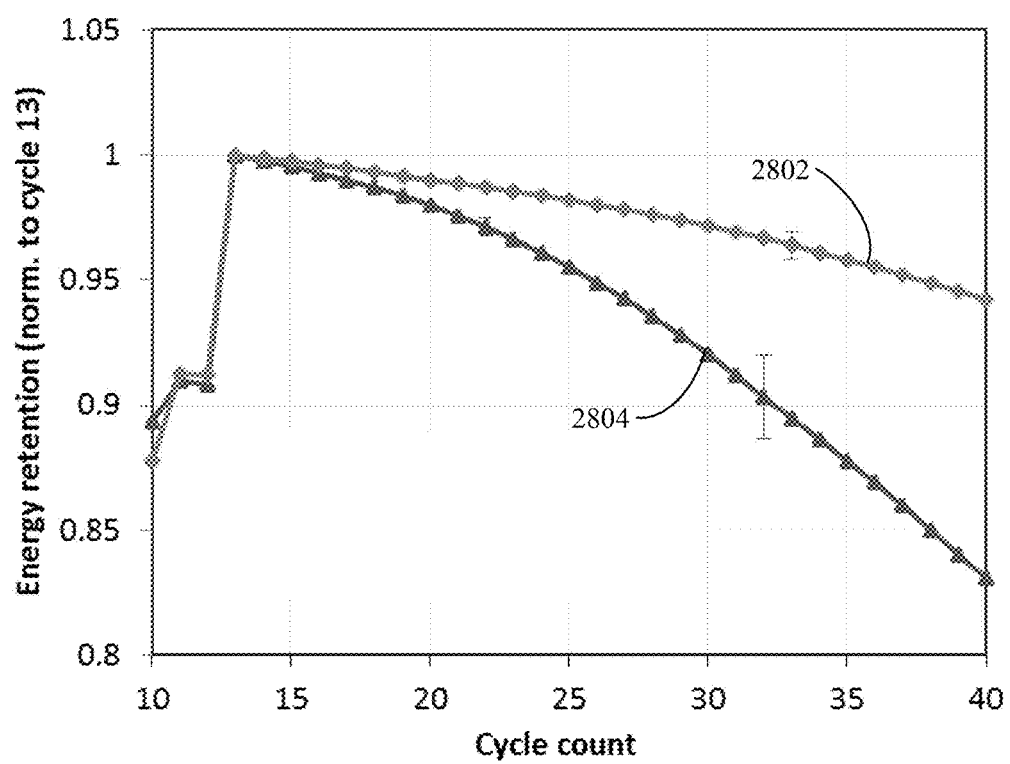

FIG. 28C illustrates the difference in the potential profile of the multi-grain cathode material from the mono-grain cathode material. Voltage and capacity fade increased greatly in the multi-grain cathode material 2804 compared to the mono-grain cathode material 2802. This occurs even with the multi-grain cathode material 2804 having a lower ratio of Li/TM, which is expected to improve the voltage and capacity retention. The overall energy retention of the cathode material as illustrated in FIG. 28D consequently fades more rapidly with the multi-grain cathode material 2804 compared to the mono-grain cathode material 2802.

It will be appreciated by those skilled in the art that the precursors or cathode materials may vary in various embodiments.

The coatings, powder, and cathode active materials can be used in batteries as described herein. The materials can be used in electronic devices. An electronic device herein can refer to any electronic device known in the art, including a portable electronic device. For example, the electronic device can be a telephone, such as a cell phone, and a land-line phone, or any communication device, such as a smart phone, including, for example an iPhone®, an electronic email sending/receiving device. The electronic device can also be an entertainment device, including a portable DVD player, conventional DVD player, Blue-Ray disk player, video game console, music player, such as a portable music player (e.g., iPod®), etc. The electronic device can be a part of a display, such as a digital display, a TV monitor, an electronic-book reader, a portable web-browser (e.g., iPad®), watch (e.g., AppleWatch), or a computer monitor. The electronic device can also be a part of a device that provides control, such as controlling the streaming of images, videos, sounds (e.g., Apple TV®), or it can be a remote control for an electronic device. Moreover, the electronic device can be a part of a computer or its accessories, such as the hard drive tower housing or casing, laptop housing, laptop keyboard, laptop track pad, desktop keyboard, mouse, and speaker. The battery and battery packs can also be applied to a device such as a watch or a clock. The components powered by a battery or battery pack can include, but are not limited to, microprocessors, computer readable storage media, in-put and/or out-put devices such as a keyboard, track pad, touch-screen, mouse, speaker, and the like.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

We claim:

1. A cathode material comprising a plurality of particles, the particles comprising a compound represented by Formula:

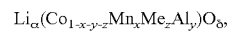

$$Li_\alpha(Co_{1-x-y-z}Mn_xMe_zAl_y)O_\delta,$$

wherein $0.95 < \alpha < 1.05$, $x < 1.00$, $0 < y \leq 0.04$, $0 < z \leq 0.050$, and $\delta = 2$, wherein Me is Ni, wherein the particles have a particle size distribution with a D50 ranging from 10 μm to 20 μm;

wherein the particles have D10 less than 8 μm; and wherein the D99 of the particles ranges from 25 μm to 35 μm.

2. The cathode material of claim 1, wherein Me further comprises at least one element selected from B, Na, Mg, Ti, Ca, V, Cr, Fe, Cu, Zn, Sc, Y, Ga, Zr, La, Ru, and Mo.

3. The cathode material of claim 1, wherein the D50 ranges from 12 μm to 17 μm.

4. The cathode material of claim 1, wherein the D90 of the particles ranges from 20 μm to 30 μm.

5. A cathode comprising the cathode material of claim 1.

6. A battery comprising:
a cathode of claim 5;
a separator; and
an anode.

* * * * *